US012193005B2

(12) United States Patent
Shin et al.

(10) Patent No.: US 12,193,005 B2
(45) Date of Patent: **\*Jan. 7, 2025**

(54) SIGNALING UPLINK CONTROL INFORMATION IN LTE-A

(71) Applicant: INTERDIGITAL PATENT HOLDINGS, INC., Wilmington, DE (US)

(72) Inventors: Sung-Hyuk Shin, Northvale, NJ (US); Pascal M. Adjakple, Great Neck, NY (US); John W. Haim, Baldwin, NY (US); Janet A. Stern-Berkowitz, Little Neck, NY (US); Vincent Roy, Longueuil (CA)

(73) Assignee: INTERDIGITAL PATENT HOLDINGS, INC., Wilmington, DE (US)

( \* ) Notice: Subject to any disclaimer, the term of this patent is extended or adjusted under 35 U.S.C. 154(b) by 0 days.

This patent is subject to a terminal disclaimer.

(21) Appl. No.: 15/636,090

(22) Filed: Jun. 28, 2017

(65) Prior Publication Data
US 2017/0303267 A1 Oct. 19, 2017

Related U.S. Application Data

(63) Continuation of application No. 12/818,939, filed on Jun. 18, 2010, now Pat. No. 9,722,735.
(Continued)

(51) Int. Cl.
*H04W 72/21* (2023.01)
*H04L 1/00* (2006.01)
(Continued)

(52) U.S. Cl.
CPC .......... *H04W 72/21* (2023.01); *H04L 1/0028* (2013.01); *H04L 1/1861* (2013.01); *H04L 5/0053* (2013.01); *H04W 72/02* (2013.01)

(58) Field of Classification Search
CPC ... H04L 1/1861; H04L 1/0028; H04L 5/0053; H04L 1/0026; H04W 72/02; H04W 72/21
See application file for complete search history.

(56) References Cited

U.S. PATENT DOCUMENTS 7,545,732 B2 6/2009 Oh et al.
8,000,291 B2 8/2011 Pinheiro et al.
(Continued)

FOREIGN PATENT DOCUMENTS

CN 1585394 A 2/2005
CN 101002450 A 7/2007
(Continued)

OTHER PUBLICATIONS

3rd Generation Partnership Project (3GPP), R1-074675, "Uplink Reference Signal Sequence Assignments in E-UTRA", Texas Instruments, 3GPP TSG RAN WG1#51, Jeju, Korea, Nov. 5-9, 2007, 3 pages.
(Continued)

*Primary Examiner* — Christine Ng
(74) *Attorney, Agent, or Firm* — CONDO ROCCIA KOPTIW LLP

(57) ABSTRACT

Methods and systems for transmitting uplink control information in an LTE Advanced system are disclosed. A user device may determine whether uplink control information and/or available channels meet certain criteria and determine whether the uplink control information should be transmitted on a physical uplink control channel, a physical uplink shared channel, or both, based on the criteria. Criteria may include the size of the uplink control information (absolute size or relative to space available on a channel or a threshold value), the type of control information bits, the number of available (i.e., active or configured) component carriers, and
(Continued)

the amount of power that may be required to transmit the uplink control information on more than one channel.

20 Claims, 11 Drawing Sheets

Related U.S. Application Data

(60) Provisional application No. 61/220,017, filed on Jun. 24, 2009, provisional application No. 61/218,782, filed on Jun. 19, 2009.

(51) Int. Cl.
*H04L 1/1829* (2023.01)
*H04L 5/00* (2006.01)
*H04W 72/02* (2009.01)

(56) References Cited

U.S. PATENT DOCUMENTS

| | | | |
|---|---|---|---|
| 8,027,670 | B2 | 9/2011 | Kuivalainen |
| 8,311,053 | B2 | 11/2012 | Choi |
| 8,345,618 | B2 | 1/2013 | Kim et al. |
| 8,555,063 | B2 | 10/2013 | Xiao et al. |
| 8,897,231 | B2 | 11/2014 | Sawahashi et al. |
| 8,989,741 | B2 | 3/2015 | Tamaki et al. |
| 9,402,247 | B2 | 7/2016 | Bala et al. |
| 9,722,735 | B2 * | 8/2017 | Shin ............ H04L 1/0028 |
| 2003/0099212 | A1 | 5/2003 | Anjum et al. |
| 2005/0201301 | A1 | 9/2005 | Bridgelall |
| 2006/0280142 | A1 | 12/2006 | Damnjanovic et al. |
| 2007/0076670 | A1 | 4/2007 | Kuchibhotla et al. |
| 2007/0140102 | A1 | 6/2007 | Oh et al. |
| 2007/0171864 | A1 | 7/2007 | Zhang et al. |
| 2008/0045260 | A1 | 2/2008 | Muharemovic et al. |
| 2008/0049668 | A1 | 2/2008 | Kakura et al. |
| 2008/0069035 | A1 | 3/2008 | Pinheiro et al. |
| 2008/0253318 | A1 | 10/2008 | Malladi et al. |
| 2008/0285512 | A1 | 11/2008 | Pan et al. |
| 2008/0311919 | A1 | 12/2008 | Whinnett et al. |
| 2009/0023435 | A1 | 1/2009 | Kuivalainen |
| 2009/0103428 | A1 | 4/2009 | Kim et al. |
| 2009/0116570 | A1 | 5/2009 | Bala et al. |
| 2009/0135769 | A1 | 5/2009 | Sambhwani et al. |
| 2009/0147875 | A1 | 6/2009 | Akita et al. |
| 2009/0181712 | A1 | 7/2009 | Xu |
| 2009/0186613 | A1 | 7/2009 | Ahn et al. |
| 2009/0201825 | A1 * | 8/2009 | Shen ............ H04L 1/0026 370/252 |
| 2009/0207784 | A1 | 8/2009 | Lee et al. |
| 2009/0239568 | A1 | 9/2009 | Bertrand et al. |
| 2009/0245331 | A1 | 10/2009 | Palanki et al. |
| 2009/0247150 | A1 | 10/2009 | Fischer et al. |
| 2009/0303937 | A1 | 12/2009 | Sawahashi et al. |
| 2009/0303978 | A1 | 12/2009 | Pajukoski et al. |
| 2009/0325578 | A1 | 12/2009 | Li et al. |
| 2010/0056175 | A1 | 3/2010 | Bachmann et al. |
| 2010/0091755 | A1 | 4/2010 | Kwon et al. |
| 2010/0098012 | A1 * | 4/2010 | Bala ............ H04W 72/0446 370/329 |
| 2010/0135231 | A1 | 6/2010 | Harada et al. |
| 2010/0135273 | A1 | 6/2010 | Kim |
| 2010/0136992 | A1 | 6/2010 | Harada et al. |
| 2010/0144354 | A1 | 6/2010 | Ho et al. |
| 2010/0234061 | A1 | 9/2010 | Khandekar et al. |
| 2010/0246463 | A1 * | 9/2010 | Papasakellariou .. H04W 52/325 370/311 |
| 2010/0271970 | A1 | 10/2010 | Pan et al. |
| 2010/0273494 | A1 | 10/2010 | Iwai et al. |
| 2010/0331003 | A1 | 12/2010 | Park et al. |
| 2011/0002290 | A1 * | 1/2011 | Kim ............ H04L 1/0026 370/329 |
| 2011/0013719 | A1 * | 1/2011 | Taoka ............ H04B 7/0417 375/295 |
| 2011/0021230 | A1 | 1/2011 | Moberg et al. |
| 2011/0032926 | A1 | 2/2011 | Xia et al. |
| 2011/0038271 | A1 | 2/2011 | Shin et al. |
| 2011/0038341 | A1 | 2/2011 | Norlund et al. |
| 2011/0059767 | A1 | 3/2011 | Parkvall et al. |
| 2011/0078445 | A1 | 3/2011 | Xiao et al. |
| 2011/0083066 | A1 | 4/2011 | Chung et al. |
| 2011/0111753 | A1 | 5/2011 | Vainikka et al. |
| 2011/0151913 | A1 | 6/2011 | Forster et al. |
| 2011/0205981 | A1 * | 8/2011 | Koo ............ H04W 72/1284 370/329 |
| 2011/0216713 | A1 | 9/2011 | Kim et al. |
| 2011/0216729 | A1 | 9/2011 | Miki et al. |
| 2011/0255469 | A1 | 10/2011 | Kishiyama et al. |
| 2011/0274099 | A1 * | 11/2011 | Kwon ............ H04L 1/0027 370/338 |
| 2012/0003962 | A1 | 1/2012 | Jeon et al. |
| 2012/0057545 | A1 | 3/2012 | Hariharan et al. |
| 2012/0113827 | A1 | 5/2012 | Yamada et al. |
| 2012/0163330 | A1 | 6/2012 | Mitra et al. |
| 2012/0176996 | A1 | 7/2012 | Kim et al. |
| 2012/0182914 | A1 | 7/2012 | Hariharan et al. |
| 2012/0231797 | A1 | 9/2012 | Van Phan et al. |
| 2013/0012244 | A1 | 1/2013 | Lee et al. |
| 2013/0083742 | A1 | 4/2013 | Baldemair et al. |
| 2013/0178221 | A1 * | 7/2013 | Jung ............ H04W 52/146 455/450 |
| 2014/0016494 | A1 | 1/2014 | Van Phan et al. |
| 2014/0177572 | A1 * | 6/2014 | Papasakellariou .... H04L 5/0055 370/329 |
| 2017/0303267 | A1 * | 10/2017 | Shin ............ H04L 1/1861 |

FOREIGN PATENT DOCUMENTS

| | | |
|---|---|---|
| CN | 101243714 A | 8/2008 |
| CN | 101296513 A | 10/2008 |
| CN | 101409894 A | 4/2009 |
| CN | 101835224 A | 9/2010 |
| EP | 1811683 A2 | 7/2007 |
| EP | 1811685 A2 | 7/2007 |
| EP | 2036238 A1 | 3/2009 |
| EP | 2273831 A1 | 1/2011 |
| EP | 2348658 A2 | 7/2011 |
| EP | 2351445 A1 | 8/2011 |
| GB | 2439367 A | 12/2007 |
| JP | 2008-236426 A | 10/2008 |
| JP | 2010-074754 A | 4/2010 |
| JP | 2011-097154 A | 5/2011 |
| JP | 2012-507241 A | 3/2012 |
| JP | 2012-169693 A | 9/2012 |
| JP | 2012-520645 A | 9/2012 |
| KR | 10-2009-0024272 A | 3/2009 |
| KR | 10-2013-0008624 A | 1/2013 |
| WO | 2007/044414 A1 | 4/2007 |
| WO | 2008/038112 A2 | 4/2008 |
| WO | WO 2008/042187 A2 | 4/2008 |
| WO | WO 2008/120925 A1 | 10/2008 |
| WO | WO 2009/011523 A1 | 1/2009 |
| WO | WO 2009/021244 A2 | 2/2009 |
| WO | WO 2010/058979 A2 | 5/2010 |
| WO | 2010/101442 A2 | 9/2010 |
| WO | WO 2010/105667 A1 | 9/2010 |
| WO | 2011/038784 A1 | 4/2011 |
| WO | 2011/059300 A2 | 5/2011 |
| WO | 2011/123755 A1 | 10/2011 |

OTHER PUBLICATIONS

3rd Generation Partnership Project (3GPP), R1-082468, "Carrier Aggregation in LTE-Advanced", Ericsson, 3GPP TSG-RAN WG1, Meeting #53bis, Warsaw, Poland, Jun. 30-Jul. 4, 2008, 6 pages.
3rd Generation Partnership Project (3GPP), R1-082807, "CM Analysis of UL Transmission for LTE-A", InterDigital Communications, LLC, 3GPP TSG-RAN WG1, Meeting #54, Jeju, Korea, Aug. 18-22, 2008, 8 pages.
3rd Generation Partnership Project (3GPP), R1-082999, "Support of UL/DL Asymmetric Carrier Aggregation", Panasonic, 3GPP TSG RAN WG1 Meeting #54, Jeju, Korea, Aug. 18-22, 2008, 3 pages.

(56) References Cited

OTHER PUBLICATIONS

3rd Generation Partnership Project (3GPP), R1-083193, "Carrier Aggregation Operation in LTE-Advanced", Qualcomm Europe, 3GPP TSG RAN WG1 Meeting #54, Jeju, South Korea, Aug. 18-22, 2008, pp. 1-4.
3rd Generation Partnership Project (3GPP), R1-083528, "Issues on Carrier Aggregation for Advanced E-UTRA", Texas Instruments, 3GPP TSG RAN WG1 54bis, Prague, Czech Republic, Sep. 29-Oct. 3, 2008, 6 pages.
3rd Generation Partnership Project (3GPP), R1-083679, "UL Layered Control Signal Structure in LTE-Advanced", NTT DoCoMo Inc., 3GPP TSG RAN WG1, Meeting #54bis, Sep. 29-Oct. 3, 2008, 14 pages.
3rd Generation Partnership Project (3GPP), R1-083706, "DL/UL Asymmetric Carrier Aggregation", Huawei, 3GPP TSG-RAN WG1 #54b, San Francisco, USA, May 4-8, 2009, pp. 1-5.
3rd Generation Partnership Project (3GPP), R1-083730, "L1 Control Signaling With Carrier Aggregation in LTE-Advanced", Nokia, Nokia Siemens Networks, 3GPP TSG-RAN WG1 Meeting #54bis, Prague, Czech Republic, Sep. 29-Oct. 3, 2008, 6 pages.
3rd Generation Partnership Project (3GPP), R1-083733, "Algorithms and Results for Autonomous Component Carrier Selection for LTE-Advanced", Nokia Siemens Networks, 3GPP TSG RAN WG1 #54bis Meeting, Prague, Czech Republic, Sep. 29-Oct. 3, 2008, 5 pages.
3rd Generation Partnership Project (3GPP), R1-084190, "Draft CR for 36.213 of Clarification of Misconfiguration of Aperiodic CQI and SR", LGE, 3GPP TSG-RAN1 Meeting #55, Prague, Czech Republic, Nov. 10-14, 2008, 2 pages.
3rd Generation Partnership Project (3GPP), R1-084398, "Aspects to Consider for DL Transmission Schemes of LTE-A", Qualcomm Europe, 3GPP TSG-RAN WG1, Meeting #55, Prague, Czech Republic, Nov. 10-14, 2008, 11 pages.
3rd Generation Partnership Project (3GPP), R1-090234, "UL Control Signalling to Support Bandwidth Extension in LTE-Advanced", Nokia Siemens Networks, 3GPP TSG-RAN WG1, Meeting #55bis, Ljubljana, Slovenia, Jan. 12-16, 2009, 5 pages.
3rd Generation Partnership Project (3GPP), R1-090362, "Support of Concurrent Transmission of PUCCH and PUSCH in LTE-A Uplink", Qualcomm Europe, 3GPP TSGRAN WG1, Meeting #55bis, Ljubljana, Slovenia, Jan. 12-16, 2009, 3 pages.
3rd Generation Partnership Project (3GPP), R1-090363, "CM Analysis of Concurrent PUSCH and PUCCH UL Transmission for LTE-A", Qualcomm Europe, 3GPP TSG-RAN WG1, Meeting #55bis, Ljubljana, Slovenia, Jan. 12-16, 2009, 7 pages.
3rd Generation Partnership Project (3GPP), R1-090430, "Alignment of RAN1/RAN4 Specification on UE Maximum Output Power", LG Electronics, 3GPP TSG-RAN WG1, Meeting #55bis, Ljubljana, Slovenia, Jan. 12-16, 2009, 8 pages.
3rd Generation Partnership Project (3GPP), R1-090544, "Text Proposal For TR36.814 on Uplink Transmission Scheme", Ericsson, 3GPP TSG-RAN WG1, Meeting #55bis, Ljubljana, Slovenia, Jan. 12-16, 2009, 2 pages.
3rd Generation Partnership Project (3GPP), R1-090654, "Pucch Piggybacking Onto PUSCH in Case of Transmit Power Limitation", LG Electronics, 3GPP TSG-RAN WG1, Meeting #56, Athens, Greece, Feb. 9-13, 2009, 4 pages.
3rd Generation Partnership Project (3GPP), R1-090655, "Uplink Multiple Channel Transmission in Case of UE Transmit Power Limitation", LG Electronics, 3GPP TSG-RAN WG1, Meeting #56, Athens, Greece, Feb. 9-13, 2009, 3 pages.
3rd Generation Partnership Project (3GPP), R1-090738, "PUSCH Power Control for LTE-Advanced", Nokia Siemens Networks, Nokia, 3GPP TSG-RAN WG1, Meeting #56, Athens, Greece, Feb. 9-13, 2009, 3 pages.
3rd Generation Partnership Project (3GPP), R1-091810, "Pucch Design For Carrier Aggregation", Huawei, 3GPP TSG RAN WG1 #57, San Francisco, USA, May 4-8, 2009, 8 pages.
3rd Generation Partnership Project (3GPP), R1-091876, "CSI Signaling in L TE-A", Samsung, 3GPP TSG RAN WG1 #57, San Francisco, USA, May 4-8, 2009, pp. 1-3.
3rd Generation Partnership Project (3GPP), R1-091878, "Concurrent PUSCH and PUCCH Transmissions", Samsung, 3GPP TSG RAN WG1 #57, San Francisco, USA, May 4-8, 2009, pp. 1-2.
3rd Generation Partnership Project (3GPP), R1-091880, "UL Transmission Power Control in LTE-A", Samsung, 3GPP TSG RAN WG1 #57, San Francisco, USA, May 4-8, 2009, pp. 1-5.
3rd Generation Partnership Project (3GPP), R1-092415, "Uplink Power Control for Carrier Aggregation", Research in Motion, UK Limited, 3GPP TSG-RAN WG1, Meeting #57b, Los Angeles, CA, Jun. 29-Jul. 3, 2009, 3 pages.
3rd Generation Partnership Project (3GPP), R1-092574, "PUSCH Power Control for LTE-Advanced", Nokia Siemens Networks, Nokia, 3GPP TSG-RAN WG1, Meeting #57, Los Angeles, CA, Jun. 29-Jul. 3, 2009, 4 pages.
3rd Generation Partnership Project (3GPP), R1-092670, "UL Transmission Power Control in LTE-A", Samsung, 3GPP TSG-RAN WG1, Meeting #57bis, Los Angeles, CA, Jun. 29-Jul. 3, 2009, 5 pages.
3rd Generation Partnership Project (3GPP), R1-092983, "LS on Power Amplifier Configurations for UEs With Multiple Transmit Antennas in LTE-A", Qualcomm Europe, 3GPP TSG-RAN WG1, Meeting #57, Los Angeles, CA, Jun. 29-Jul. 3, 2009, 5 pages.
3rd Generation Partnership Project (3GPP), TR 36.814 V1.5.0, "Technical Specification Group Radio Access Network, Further Advancements for E-UTRA Physical Layer Aspects (Release 9)", Nov. 2009, pp. 1-53.
3rd Generation Partnership Project (3GPP), TS 25.101 V6.8.0, "Technical Specification Group Radio Access Network, User Equipment (UE) Radio Transmission and Reception (FDD) (Release 6)", Jun. 2005, pp. 1-118.
3rd Generation Partnership Project (3GPP), TS 25.101 V8.4.0, "Technical Specification Group Radio Access Network, User Equipment (UE) Radio Transmission and Reception (FDD) (Release 8)", Sep. 2008, pp. 1-189.
3rd Generation Partnership Project (3GPP), TS 25.101 V8.5.1, "Technical Specification Group Radio Access Network, User Equipment (UE) Radio Transmission and Reception (FDD) (Release 8)", Jan. 2009, pp. 1-214.
3rd Generation Partnership Project (3GPP), TS 25.101 V8.8.0, "Technical Specification Group Radio Access Network, User Equipment (UE) Radio Transmission and Reception (FDD) (Release 8)", Sep. 2009, pp. 1-217.
3rd Generation Partnership Project (3GPP), TS 25.101 V8.9.0, "Technical Specification Group Radio Access Network, User Equipment (UE) Radio Transmission and Reception (FDD) (Release 8)", Dec. 2009, pp. 1-217.
3rd Generation Partnership Project (3GPP), TS 25.101 V9.2.0, "Technical Specification Group Radio Access Network, User Equipment (UE) Radio Transmission and Reception (FDD) (Release 9)", Dec. 2009, pp. 1-245.
3rd Generation Partnership Project (3GPP), TS 36.211 V10.0.0, "Technical Specification Group Radio Access Network, Evolved Universal Terrestrial Radio Access (E-UTRA), Physical Channels and Modulation (Release 10)", Dec. 2010, pp. 1-102.
3rd Generation Partnership Project (3GPP), TS 36.211 V8.4.0, "Technical Specification Group Radio Access Network, Evolved Universal Terrestrial Radio Access (E-UTRA), Physical Channels and Modulation (Release 8)", Sep. 2008, pp. 1-78.
3rd Generation Partnership Project (3GPP), TS 36.211 V8.8.0, "Technical Specification Group Radio Access Network, Evolved Universal Terrestrial Radio Access (E-UTRA), Physical Channels and Modulation (Release 8)", Sep. 2009, pp. 1-83.
3rd Generation Partnership Project (3GPP), TS 36.212 V10.0.0, "Technical Specification Group Radio Access Network, Evolved Universal Terrestrial Radio Access (E-UTRA), Multiplexing and Channel Coding (Release 10)", Dec. 2010, pp. 1-72.
3rd Generation Partnership Project (3GPP), TS 36.212 V8.4.0, "Technical Specification Group Radio Access Network, Evolved Universal Terrestrial Radio Access (E-UTRA), Multiplexing and Channel Coding (Release 8)", Sep. 2008, pp. 1-56.

(56) References Cited

OTHER PUBLICATIONS

3rd Generation Partnership Project (3GPP), TS 36.212 V8.7.0, "Technical Specification Group Radio Access Network, Evolved Universal Terrestrial Radio Access (E-UTRA), Multiplexing and Channel Coding (Release 8)", May 2009, pp. 1-60.
3rd Generation Partnership Project (3GPP), TS 36.213 V8.4.0, "Technical Specification Group Radio Access Network, Evolved Universal Terrestrial Radio Access (E-UTRA), Physical Layer Procedures (Release 8)", Sep. 2008, pp. 1-60.
3rd Generation Partnership Project (3GPP), TS 36.213 V8.5.0, "Technical Specification Group Radio Access Network, Evolved Universal Terrestrial Radio Access (E-UTRA), Physical Layer Procedures (Release 8)", Dec. 2008, pp. 1-74.
3rd Generation Partnership Project (3GPP), TS 36.213 V8.8.0, "Technical Specification Group Radio Access Network, Evolved Universal Terrestrial Radio Access (E-UTRA), Physical Layer Procedures (Release 8)", Sep. 2009, pp. 1-77.
3rd Generation Partnership Project (3GPP), TS 36.213 V9.0.1, "Technical Specification Group Radio Access Network, Evolved Universal Terrestrial Radio Access (E-UTRA), Physical Layer Procedures (Release 9)", Dec. 2009, pp. 1-79.
3rd Generation Partnership Project (3GPP), TS 36.321 V8.1.0, "Technical Specification Group Radio Access Network, Evolved Universal Terrestrial Radio Access (E-UTRA), Medium Access Control (MAC) Protocol Specification (Release 8)", Mar. 2008, pp. 1-30.
3rd Generation Partnership Project (3GPP), TS 36.321 V8.4.0, "Technical Specification Group Radio Access Network, Evolved Universal Terrestrial Radio Access (E-UTRA), Medium Access Control (MAC) Protocol Specification (Release 8)", Dec. 2008, pp. 1-43.
3rd Generation Partnership Project (3GPP), TS 36.321 V8.8.0, "Technical Specification Group Radio Access Network, Evolved Universal Terrestrial Radio Access (E-UTRA), Medium Access Control (MAC) Protocol Specification (Release 8)", Dec. 2009, pp. 1-47.
3rd Generation Partnership Project (3GPP), TS 36.331 V8.3.0, "Technical Specification Group Radio Access Network, Evolved Universal Terrestrial Radio Access (E-UTRA) Radio Resource Control (RRC), Protocol Specification (Release 8)", Sep. 2008, pp. 1-178.
3rd Generation Partnership Project (3GPP), TS 36.331 V8.4.0, "Technical Specification Group Radio Access Network, Evolved Universal Terrestrial Radio Access (E-UTRA), Radio Resource Control (RRC), Protocol Specification (Release 8)", Dec. 2008, pp. 1-198.
3rd Generation Partnership Project (3GPP), TS 36.331 V8.7.0, "Technical Specification Group Radio Access Network, Evolved Universal Terrestrial Radio Access (E-UTRA) Radio Resource Control (RRC), Protocol Specification (Release 8)", Sep. 2009, pp. 1-208.
3rd Generation Partnership Project (3GPP), TS 36.331 V9.1.0, "Technical Specification Group Radio Access Network, Evolved Universal Terrestrial Radio Access (E-UTRA), Radio Resource Control (RRC), Protocol Specification (Release 9)", Dec. 2009, pp. 1-233.
Lim et al., "Channel-Dependent Scheduling of Uplink Single Carrier FDMA Systems", Wireless Communications and Networking Conference, WCNC, IEEE, Mar. 31, 2008, 5 pages.
$3^{rd}$ Generation Partnership Project (3GPP), R1-082255, "Confirmation of Various UL Transmission Configurations—Revision 1", Qualcomm Europe, LGE, Panasonic, 3GPP TSG-RAN WG1 #53, May 5-9, 2008, 3 pages.
3rd Generation Partnership Project (3GPP), R1-061674, "Single-Carrier Based Multiplexing of Uplink L1/L2 Control Channel", NTT DoCoMo, Fujitsu, NEC, Sharp, Toshiba Corporation, 3GPP TSG RAN WG1 LTE Ad Hoc, Cannes, France, Jun. 27-30, 2006, pp. 1-8.
3rd Generation Partnership Project (3GPP), R1-084544, "Clarification of Misconfiguration of Aperiodic CQI and SR", LGE, Ericsson, 3GPP TSG- RAN1 Meeting #55, Prague, Czech, Nov. 10-14, 2008, pp. 1-10.
3rd Generation Partnership Project (3GPP), R1-092103, "Control Overhead Analysis on Aperiodic PUSCH", Sharp, 3GPP TSG-RAN WG1#57, San Francisco, CA, U.S.A., May 4-8, 2009, pp. 1-15.
3rd Generation Partnership Project (3GPP), R1-102746, "UCI Transmission for CA", Qualcomm Incorporated, 3GPP TSG RAN WG1 #61, Montreal, Canada, May 10-14, 2010, pp. 1-4.
3rd Generation Partnership Project (3GPP), RP-081075, "CRs to 36.213 (Rel-8, F) LTE Physical Layer Updates", TSG RAN WG1, TSG-RAN Meeting #42, Athens, Greece, Dec. 2-5, 2008, 14 pages.
3rd Generation Partnership Project (3GPP), TS 36.213 V8.6.0, "Technical Specification Group Radio Access Network, Evolved Universal Terrestrial Radio Access (E-UTRA), Physical Layer Procedures (Release 8)", Mar. 2009, pp. 1-77.
Dahlman, Erik, et al., "3G Evolution HSPA and LTE for Mobile Broadband", Academic Press, Elsevier Ltd., ISBN: 978-0-12-374538-5, 2008, pp. 396-413, 32 pages.
Jia, Shen et al., "3GPP Long Term Evolution: Principle and System Design", Posts & Telecom Press, Nov. 2008, "" 863' Communication High Technology Series, ISBN 978-7-115-18572-3, 2008, pp. 1-5, 11-12, and 50, 27 pages.
Jia, Shen et al., "3GPP Long Term Evolution: Principle and System Design", Posts & Telecom Press, Nov. 2008, "" 863' Communication High Technology Series, ISBN 978-7-115-18572-3, 2008, pp. 247-249 and 264- 266, 17 pages.
$3^{rd}$ Generation Partnership Project (3GPP), R1-082255, "Confirmation of various UL transmission configurations—Revision 1", Qualcomm Europe, LGE, Panasonic, 3GPP TSG-RAN WG1, Meeting #53, Kansas City, USA, May 5-9, 2008, 3 pages.
$3^{rd}$ Generation Partnership Project (3GPP), R1-090234, "UL control signaling to support bandwidth extension in LTE-Advanced", Nokia Siemens Networks, Nokia, 3GPP TSG RAN WG1, Meeting #55bis, Ljubljana, Solvenia, Jan. 12-16, 2009, 5 pages.
$3^{rd}$ Generation Partnership Project (3GPP), R1-090611, Concurrent PUSCH and PUCCH Transmissions, Samsung, 3GPP TSG RAN WG1, Meeting #56, Athens, Greece, Feb. 9-13, 2009, 2 pages.
$3^{rd}$ Generation Partnership Project (3GPP), R1-091810, "PUCCH design for carrier aggregation", Huawei, 3GPP TSG RAN WG1, Meeting #57, San Francisco, USA, May 4-8, 2009, 8 pages.
$3^{rd}$ Generation Partnership Project (3GPP), R1-091880, "UL Transmission Power Control in LTE-A", Samsung, 3GPP TSG WG1, Meeting #57, San Francisco, USA, May 4-8, 2009, 5 pages.
Jia, Shen et al., "3GPP Long Term Evolution: Principle and System Design", Posts & Telecom Press, Nov. 2008, "" 863' Communication High Technology Series, ISBN 978-7-115-18572-3, 2008, 15 pages.
Jia, Shen et al., "3GPP Long Term Evolution: Principle and System Design", Posts & Telecom Press, Nov. 2008, "" 863' Communication High Technology Series, ISBN 978-7-115-18572-3, 2008, 10 pages.
3rd Generation Partnership Project (3GPP), R1-081468, "Configuration of Periodic CQI Reporting on PUSCH", Nokia Siemens Networks, Nokia, 3GPP TSG RAN WG1 Meeting #52bis, Shenzhen, China, Mar. 31-Apr. 4, 2008, 2 pages.
3rd Generation Partnership Project (3GPP), R3-110656, "Requirements for Supporting High Speed Train Scenario in LTE", CMCC, 3GPP TSG-RAN WG3 #71, Taipei, Feb. 21-25, 2011, pp. 1-3.
3rd Generation Partnership Project (3GPP), R3-112483, "Mobile Relays Scenarios and Issues", InterDigital Communications, 3GPP TSG-RAN WG3 Meeting #73-bis, Zhuhai, China, Oct. 10-14, 2011, 5 pages.
3rd Generation Partnership Project (3GPP), TR 36.814 V9.0.0, "Technical Specification Group Radio Access Network, Evolved Universal Terrestrial Radio Access (E-UTRA), Further Advancements for E-UTRA Physical Layer Aspects (Release 9)", Mar. 2010, pp. 1-104.
3rd Generation Partnership Project (3GPP), TS 25.101 V10.1.0, "Technical Specification Group Radio Access Network, User Equipment (UE) Radio Transmission and Reception (FDD) (Release 10)", Apr. 2011, pp. 1-271.

(56) References Cited

OTHER PUBLICATIONS

3rd Generation Partnership Project (3GPP), TS 25.101 V10.5.0, "Technical Specification Group Radio Access Network, User Equipment (UE) Radio Transmission and Reception (FDD) (Release 10)", Mar. 2012, pp. 1-279.

3rd Generation Partnership Project (3GPP), TS 25.101 V11.1.0, "Technical Specification Group Radio Access Network, User Equipment (UE) Radio Transmission and Reception (FDD) (Release 11)", Mar. 2012, pp. 1-286.

3rd Generation Partnership Project (3GPP), TS 36.211 V10.1.0, "Technical Specification Group Radio Access Network, Evolved Universal Terrestrial Radio Access (E-UTRA), Physical Channels and Modulation (Release 10)", Mar. 2011, pp. 1-103.

3rd Generation Partnership Project (3GPP), TS 36.211 V10.4.0, "Technical Specification Group Radio Access Network, Evolved Universal Terrestrial Radio Access (E-UTRA), Physical Channels and Modulation (Release 10)", Dec. 2011, pp. 1-101.

3rd Generation Partnership Project (3GPP), TS 36.211 V8.9.0, "Technical Specification Group Radio Access Network, Evolved Universal Terrestrial Radio Access (E-UTRA), Physical Channels and Modulation (Release 8)", Dec. 2009, pp. 1-83.

3rd Generation Partnership Project (3GPP), TS 36.211 V9.1.0, "Technical Specification Group Radio Access Network, Evolved Universal Terrestrial Radio Access (E-UTRA), Physical Channels and Modulation (Release 9)", Mar. 2010, pp. 1-85.

3rd Generation Partnership Project (3GPP), TS 36.212 V10.1.0, "Technical Specification Group Radio Access Network, Evolved Universal Terrestrial Radio Access (E-UTRA), Multiplexing and Channel Coding (Release 10)", Mar. 2011, pp. 1-76.

3rd Generation Partnership Project (3GPP), TS 36.212 V10.5.0, "Technical Specification Group Radio Access Network, Evolved Universal Terrestrial Radio Access (E-UTRA), Multiplexing and Channel Coding (Release 10)", Mar. 2012, pp. 1-79.

3rd Generation Partnership Project (3GPP), TS 36.213 V10.1.0, "Technical Specification Group Radio Access Network, Evolved Universal Terrestrial Radio Access (E-UTRA), Physical Layer Procedures (Release 10)", Mar. 2011, pp. 1-115.

3rd Generation Partnership Project (3GPP), TS 36.213 V10.5.0, "Technical Specification Group Radio Access Network, Evolved Universal Terrestrial Radio Access (E-UTRA), Physical Layer Procedures (Release 10)", Mar. 2012, 125 pages.

3rd Generation Partnership Project (3GPP), TS 36.300 V10.3.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 10)", Mar. 2011, pp. 1-197.

3rd Generation Partnership Project (3GPP), TS 36.300 V10.7.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 10)", Mar. 2012, pp. 1-194.

3rd Generation Partnership Project (3GPP), TS 36.300 V11.1.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 11)", Mar. 2012, pp. 1-194.

3rd Generation Partnership Project (3GPP), TS 36.300 V8.12.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Mar. 2010, pp. 1-22.

3rd Generation Partnership Project (3GPP), TS 36.300 V9.7.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 9)", Mar. 2011, pp. 1-174.

3rd Generation Partnership Project (3GPP), TS 36.300 V9.9.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 9)", Dec. 2011, pp. 1-174.

3rd Generation Partnership Project (3GPP), TS 36.321 V10.1.0, "Technical Specification Group Radio Access Network, Evolved Universal Terrestrial Radio Access (E-UTRA), Medium Access Control (MAC) Protocol Specification (Release 10)", Mar. 2011, pp. 1-53.

3rd Generation Partnership Project (3GPP), TS 36.321 V10.5.0, "Technical Specification Group Radio Access Network, Evolved Universal Terrestrial Radio Access (E-UTRA), Medium Access Control (MAC) Protocol Specification (Release 10)", Mar. 2012, pp. 1-54.

3rd Generation Partnership Project (3GPP), TS 36.321 V8.12.0, "Technical Specification Group Radio Access Network, Evolved Universal Terrestrial Radio Access (E-UTRA), Medium Access Control (MAC) Protocol Specification (Release 8)", Mar. 2012, pp. 1-47.

3rd Generation Partnership Project (3GPP), TS 36.321 V8.9.0, "Technical Specification Group Radio Access Network, Evolved Universal Terrestrial Radio Access (E-UTRA), Medium Access Control (MAC) Protocol Specification (Release 8)", Jun. 2010, pp. 1-47.

3rd Generation Partnership Project (3GPP), TS 36.321 V9.3.0, "Technical Specification Group Radio Access Network, Evolved Universal Terrestrial Radio Access (E-UTRA), Medium Access Control (MAC) Protocol Specification (Release 9)", Jun. 2010, pp. 1-48.

3rd Generation Partnership Project (3GPP), TS 36.321 V9.6.0, "Technical Specification Group Radio Access Network, Evolved Universal Terrestrial Radio Access (E-UTRA), Medium Access Control (MAC) Protocol Specification (Release 9)", Mar. 2012, pp. 1-48.

3rd Generation Partnership Project (3GPP), TS 36.331 V10.1.0, "Technical Specification Group Radio Access Network, Evolved Universal Terrestrial Radio Access (E-UTRA), Radio Resource Control (RRC), Protocol Specification (Release 10)", Mar. 2011, pp. 1-290.

3rd Generation Partnership Project (3GPP), TS 36.331 V10.5.0, "Technical Specification Group Radio Access Network, Evolved Universal Terrestrial Radio Access (E-UTRA), Radio Resource Control (RRC), Protocol Specification (Release 10)", Mar. 2012, pp. 1-302.

3rd Generation Partnership Project (3GPP), TS 36.331 V8.13.0, "Technical Specification Group Radio Access Network, Evolved Universal Terrestrial Radio Access (E-UTRA), Radio Resource Control (RRC), Protocol Specification (Release 8)", Mar. 2011, pp. 1-213.

3rd Generation Partnership Project (3GPP), TS 36.331 V8.16.0, "Technical Specification Group Radio Access Network, Evolved Universal Terrestrial Radio Access (E-UTRA), Radio Resource Control (RRC), Protocol Specification (Release 8)", Dec. 2011, pp. 1-214.

3rd Generation Partnership Project (3GPP), TS 36.331 V9.10.0, "Technical Specification Group Radio Access Network, Evolved Universal Terrestrial Radio Access (E-UTRA), Radio Resource Control (RRC), Protocol Specification (Release 9)", Mar. 2012, pp. 1-255.

3rd Generation Partnership Project (3GPP), TS 36.331 V9.6.0, "Technical Specification Group Radio Access Network, Evolved Universal Terrestrial Radio Access (E-UTRA), Radio Resource Control (RRC), Protocol Specification (Release 9)", Mar. 2011, pp. 1-252.

3rd Generation Partnership Project (3GPP), R1-083592, "On the HS-DPCCH Structure for Dual-Cell HSDPA Operation", Ericsson, 3GPP TSG RAN WG1 Meeting #54bis, Prague, Czech Republic, Sep. 29-Oct. 3, 2008, 6 pages.

3rd Generation Partnership Project (3GPP), R1-083680, "Initial Access Procedure for Asymmetric Wider Bandwidth in LTE-Advanced", NTT DoCoMo, 3GPP TSG RAN WG1 Meeting #54bis, Prague, Czech Republic, Sep. 29-Oct. 3, 2008, pp. 1-5.

CNIPA, "China National Intellectual Property Administration", Chinese Version of Examination Decision on Request for Invalidation of Chinese Patent No. 201410291274.0, Jun. 1, 2022, 82 pages.

(56) References Cited

OTHER PUBLICATIONS

CNIPA, "Examination Decision on Invalidation Petition (No. 561828) of Chinese Patent No. 201410291274.0", China National Intellectual Property Administration, Jun. 5, 2023, 31 pages.

* cited by examiner

SIGNALING UPLINK CONTROL INFORMATION IN LTE-A

CROSS-REFERENCE TO RELATED APPLICATIONS

This application is a continuation application of U.S. patent application Ser. No. 12/818,939, filed Jun. 18, 2010, which claims the benefit of U.S. Provisional Application No. 61/218,782, filed Jun. 19, 2009, and U.S. Provisional Application No. 61/220,017, filed Jun. 24, 2009, all of which are hereby incorporated by reference in their entirety.

BACKGROUND

In order to support higher data rate and spectrum efficiency, the Third Generation Partnership Project (3GPP) Long Term Evolution (LTE) system has been introduced into 3GPP Release 8 (R8). (LTE Release 8 may be referred to herein as LTE R8 or R8-LTE.) In LTE, transmissions on the uplink are performed using Single Carrier Frequency Division Multiple Access (SC-FDMA). In particular, the SC-FDMA used in the LTE uplink is based on Discrete Fourier Transform Spread Orthogonal Frequency Division Multiplexing (DFT-S-OFDM) technology. As used hereafter, the terms SC-FDMA and DFT-S-OFDM are used interchangeably.

In LTE, a wireless transmit/receive unit (WTRU), alternatively referred to as a user equipment (UE), transmits on the uplink using only a limited, contiguous set of assigned sub-carriers in a Frequency Division Multiple Access (FDMA) arrangement. For example, if the overall Orthogonal Frequency Division Multiplexing (OFDM) signal or system bandwidth in the uplink is composed of useful sub-carriers numbered 1 to 100, a first given WTRU may be assigned to transmit on sub-carriers 1-12, a second WTRU may be assigned to transmit on sub-carriers 13-24, and so on. While the different WTRUs may each transmit into only a subset of the available transmission bandwidth, an evolved Node-B (eNodeB) serving the WTRUs may receive the composite uplink signal across the entire transmission bandwidth.

LTE Advanced (which includes LTE Release 10 (R10) and may include future releases such as Release 11, also referred to herein as LTE-A, LTE R10, or R10-LTE) is an enhancement of the LTE standard that provides a fully-compliant 4G upgrade path for LTE and 3G networks. In both LTE and LTE-A, there is a need for certain associated layer 1/layer 2 (L1/2) uplink control information (UCI) to support the UL transmission, downlink (DL) transmission, scheduling, multiple-input multiple-output (MIMO), etc. In LTE-A, power settings for uplink channels, respectively, may be done independently. What is needed in the art are systems and methods for providing uplink control information and dealing with the power issues that may arise when using multiple uplink channels.

SUMMARY

Methods and systems for transmitting uplink control information (UCI) in an LTE Advanced system are disclosed. A user equipment device (UE) may determine whether uplink control information should be transmitted across PUCCH and PUSCH (a subset of the bits transmitted on PUCCH and the remaining bits transmitted on PUSCH) based on whether the number of bits in the UCI is less than or equal to a threshold that may be provided to the UE. If the number of UCI bits is less than or equal to the threshold, the UCI bits may be transmitted on the PUCCH, whereas if the number of UCI bits is above the threshold, the UCI bits may be transmitted on both the PUSCH and the PUCCH in the same subframe. In another embodiment, the number of UCI bits may be compared to a second, higher threshold and if the number of UCI bits exceeds the second, higher threshold, all the UCI bits may be transmitted on the PUSCH. In another embodiment, if all UCI bits will fit onto the PUCCH, they may be transmitted on the PUCCH. If all the bits will not fit onto the PUCCH, they may be transmitted on both the PUCCH and the PUSCH in the same subframe. In another embodiment, a relative size of the UCI may be determined (i.e., the size the UCI payload compared to the size of the capacity of a shared channel, e.g., PUSCH) and if the relative size is below a threshold, the UCI bits may be transmitted on PUSCH only.

In another embodiment, the type of UCI bits may be determined, and if certain types of bits are present (e.g., ACK/NACK bits), the bits of the certain type may be transmitted on one channel, such as the PUCCH, while the remaining bits may be transmitted on a second channel, such as the PUSCH. Alternatively, the number of downlink component carriers (DL CCs) that are active, or alternatively configured, and the use of transmission modes supported in LTE Release 8 may be taken into account. If the number of DL CCs is not one or transmission modes supported in LTE Release 8 are not used, a subset of UCI bits may be transmitted on PUCCH while, in the same subframe, the remaining bits may be transmitted on PUSCH. If the number of DL CCs is one and transmission modes supported in LTE Release 8 are used, the UCI may be evaluated to determine whether the contents contain certain types of UCI bits (e.g., ACK/NACK, CQI/PMI, RI) and a determination as to which channel(s) to use for transmitting such bits may be made. The priority or primary DL CCs may also be evaluated when multiple DL CCs are available (active or, alternatively, configured), and UCI bits associated with a primary or highest priority DL CC may be transmitted on PUCCH with the remaining bits being transmitted on PUSCH.

The amount of power that may be required to transmit the uplink control information on more than one channel may also be evaluated. If a UE determines that transmitting the UCI bits across both PUSCH and PUCCH will exceed a maximum power threshold, the UE may transmit the UCI bits on only one of the PUSCH and PUCCH or scale down PUSCH and/or PUCCH power. In embodiments where multiple PUSCHs are available, various means may be used to determine which PUSCH should be used to transmit UCI bits, including determining an appropriate PUSCH based on UCI payload size, PUSCH data payload size, or the relationship between UCI payload size and the carrying capacity of the available PUSCHs. These and additional aspects of the current disclosure are set forth in more detail below.

BRIEF DESCRIPTION OF THE DRAWINGS

The following detailed description of disclosed embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1:
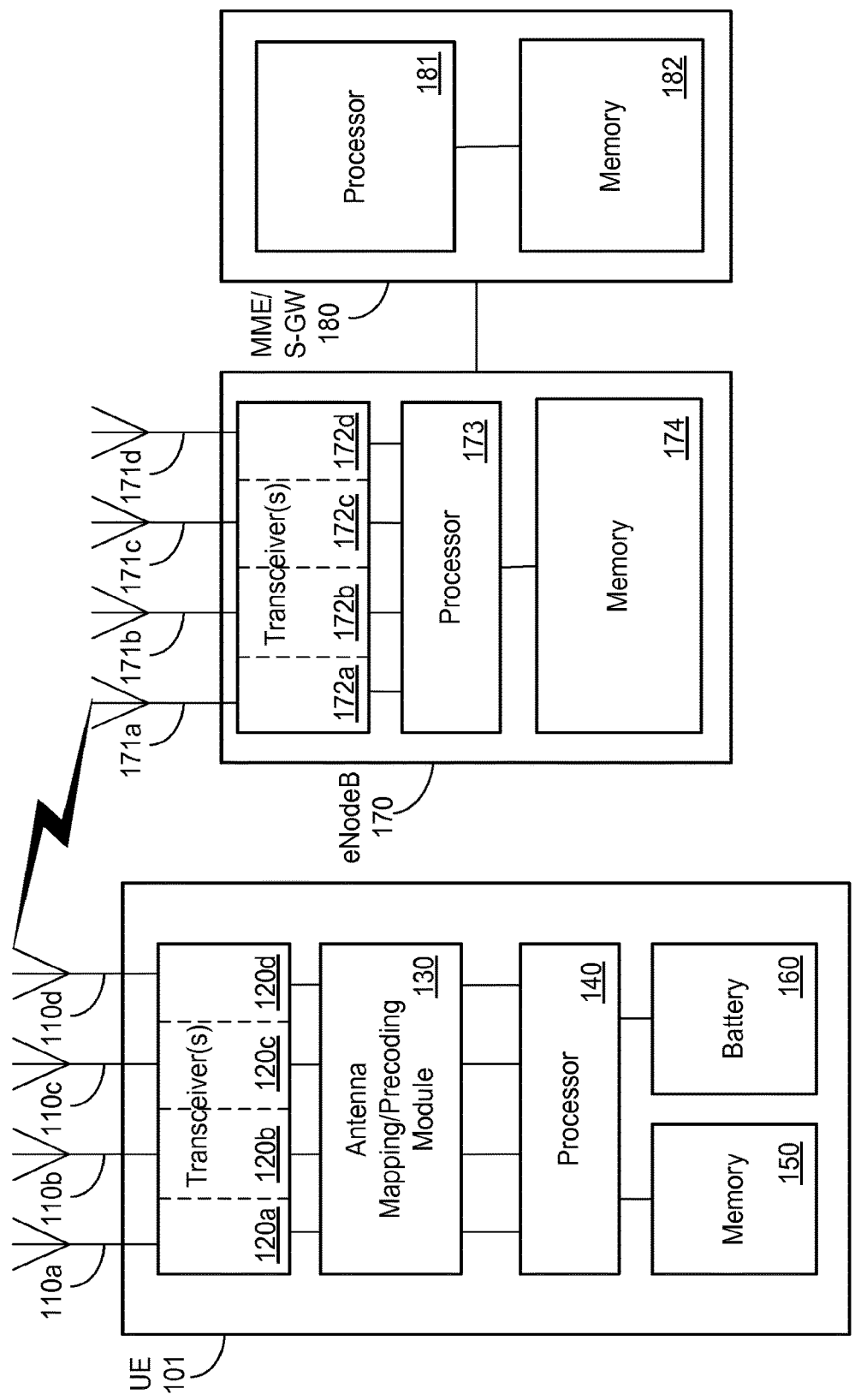
FIG. 1 illustrates a non-limiting exemplary user equipment, eNodeB, and MME/S-GW on which methods and systems for signaling uplink control information as disclosed herein may be implemented.

FIG. 1 illustrates non-limiting, exemplary UE 101 that may implement the present subject matter and features of LTE-A. UE 101 may be a wireless transmit and receive unit (WTRU) of any type, including a mobile telephone, a smart phone, a personal data assistant (PDA), a laptop, or any other device that may wirelessly communicate with one or more other devices or networks. In some embodiments, UE 101 may be configured to communicate with an LTE-A network or system. UE 101 may be configured with processor 140, which may be communicatively connected with memory 150 and may draw power from a power source, such as battery 160, which may also provide power to any or all of the other components of UE 101. Processor 140 may be configured to perform UCI signaling and related functions as disclosed herein, as well as any other functions disclosed herein and/or any other functions that may be performed by a processor configured in a UE. Memory 150 may be configured to store data, including computer executable instructions to perform any function described herein or any other function that may be performed by a UE. UE 101 may also be configured with one or more antennas 110a-d, which may transmit data received from one or more transceivers 120a-d to a base station, eNodeB, or other network device, and may provide data from such a device to one or more transceivers 120a-d.

Transceivers 120a-d and/or antennas 110a-d may be communicatively connected to antenna mapping/precoding module 130. Antenna mapping/precoding module 130 may be communicatively connected to processor 140. Note that any or all of the components illustrated in FIG. 1 may be physically the same component or combined into a single physical unit, or alternatively may be physically separate. For example, antenna mapping/precoding module 130, processor 140, and transceivers 120a-d may be physically configured on a single microchip, or may each be configured on individual microchips. Any variations of such configurations are contemplated as within the scope of the present disclosure.

UE 101 may be configured to communicate wirelessly with eNodeB 170. In addition to components that may be found in a typical eNodeB, eNodeB 170 may include processor 173, which may be any processor or multiple processors that may be configured to perform eNodeB functions and/or the subject matter disclosed herein. Processor 173 may be communicatively connected to memory 174, which may be any type of memory or combination of memory types, including volatile and non-volatile memory. eNodeB 170 may also be configured with transceivers 172a-d, which may be communicatively connected to antennas 171a-d, configured to facilitate wireless communications, for example, with UE 101 in an LTE or LTE-A system. Multiple transmit and/or receive antennas may be configured on eNodeB 170 in order to facilitate MIMO and/or other technologies that may take advantage of such multiple antennas.

eNodeB 170 may be communicatively connected, via one or more wireless or wired communications connections, to Mobility Management Entity/Serving Gateway (MME/S-GW) 180. MME/S-GW 180 may be configured with processor 181 which may be any processor or multiple processors that may be configured to perform MME/S-GW functions and/or the subject matter disclosed herein. Processor 181 may be communicatively connected to memory 182, which may be any type of memory or combination of memory types, including volatile and non-volatile memory. In one embodiment, UE 101, eNodeB 170, and/or MME/S-GW 180 are configured to implement UCI signaling in an LTE-A system as disclosed herein.

DFT-S-OFDM may be used as a communications means from UE 101 to eNodeB 170 (i.e., in uplink). DFT-S-OFDM is a form of OFDM transmission with the additional constraint that the time-frequency resource assigned to a UE consists of a set of frequency-consecutive sub-carriers. An LTE uplink may not include a direct current (DC) sub-carrier. The LTE uplink may include one mode of operation wherein frequency hopping can be applied to transmissions by a UE. In the LTE Release 8 (R8) uplink (UL), there is a need for certain associated layer 1/layer 2 (L1/L2) uplink control information (UCI) to support the UL transmission, downlink (DL) transmission, scheduling, multiple-input multiple-output (MIMO), etc. For example, UE 101 may be configured to provide UCI to eNodeB 170 periodically and/or aperiodically. UCI may consist of hybrid automatic repeat request (HARQ) acknowledgement/negative acknowledgement (ACK/NACK) which may be 1 or 2 bits, channel status reporting including a channel quality indicator (CQI), a precoding matrix indicator (PMI), and/or rank indicator (RI) which may be 4-11 bits when transmitted on a physical uplink control channel (PUCCH), and a scheduling request (SR) which may be 1 bit. These examples of numbers of bits for these types of UCI correspond to the number of bits for these types in LTE Release 8. The number of bits for these types is not limited to these values and other embodiments are contemplated as within the scope of the present disclosure.

In embodiments and examples described herein that refer to CQI, PMI, and RI bit types specifically, these embodiments may be easily extended to include additional UCI bit types that may be supported by a UE and reported periodically or aperiodically. These embodiments and examples may also be easily extended to replace any one or more of the CQI, PMI, and RI bit types with other types of UCI bits that may be supported by a UE and reported periodically or aperiodically.

In LTE Release 8, UCI may be transmitted, for example by UE 101, in one of two ways. In the absence of assigned Physical UL Shared Channel (PUSCH) resources in a subframe, the UE 101 may transmit the UCI using Physical UL Control Channel (PUCCH) resources. When UL data is present or the UE is otherwise transmitting data on a physical uplink shared channel (PUSCH), UCI signaling may take place on PUSCH and may be multiplexed with data on the PUSCH. However, in Release 8, simultaneous transmission of PUCCH and PUSCH is not supported. In addition, the simultaneous transmission of ACK/NACK and CQI by a UE may not be enabled by UE-specific higher layer signaling. In this case, the CQI is dropped, and only the ACK/NACK is transmitted using the PUCCH, which may result in some degradation in the scheduling and rate adaptation accuracy.

In LTE-Advanced (LTE-A), introduced in 3GPP Release 10 (R10), simultaneous PUSCH and PUCCH transmission, for example by UE 101, may be supported and the single-carrier constraint on UL waveform is relaxed. In Release 10, both frequency-contiguous and frequency-non-contiguous resource allocation on each UL component carrier is supported.

In LTE-A, it is anticipated that the UCI size (number of UCI bits) will be increased, compared to LTE, taking into account the new features including coordinated multipoint transmission (COMP), higher order DL MIMO, bandwidth extension, and Relay. For example, in order to support high order MIMO (e.g., 8×8 MIMO) and/or COMP, a large amount of channel status reports (CQI/PM/RI) may be fed back to the serving eNodeB (and possibly neighboring eNodeB(s) in COMP implementations). The UCI overhead will be further increased by the use of asymmetric bandwidth extension. Accordingly, the payload size of Release 8 LTE PUCCH may not be sufficient to carry the increased UCI overhead (even for a single DL component carrier) in LTE-A. UCI signaling in LTE-A may be more flexible than UCI signaling in LTE, allowing for more configurations in UCI signaling in LTE-A. Due to this, and since the UCI size (number of UCI bits) may be larger in LTE-A, new configurations to support the increased UCI size may be needed. In some embodiments of the present disclosure, the capability of simultaneous PUSCH and PUCCH transmission is taken advantage of in order to transmit the UCI signaling that may be generated in an LTE-A system, or any other system.

In addition, as the power settings for the PUSCH and PUCCH, respectively, are done independently, some rules for LTE-A UCI signaling are set forth herein for embodiments that take advantage of the simultaneous PUCCH and PUSCH transmission in a subframe for the situations where the sum of the power levels of the PUSCH and PUCCH reaches or exceeds the given maximum transmit power.

Note that as used herein, a physical uplink control channel (PUCCH) may be an LTE or LTE-A PUCCH, which is an uplink channel that carries uplink control information. Alternatively, a PUCCH as used herein can be any channel or multiple channels or other wireless communications means that may be used, exclusively or non-exclusively, to transmit control information for an uplink. As used herein, a physical uplink shared channel (PUSCH) may be an LTE or LTE-A PUSCH, which is an uplink channel that carries user data (i.e., SCH data). Alternatively, a PUSCH as used herein can be any channel or multiple channels or other wireless communication means that may be used, exclusively or non-exclusively, to transmit user data on an uplink. A PUSCH as used herein may also carry control information. Uplink control information (UCI) as used herein may be specific LTE or LTE-A control information, or UCI may be any control information used in any wireless system carried on any type of channel or wireless communications means. All such embodiments are contemplated as within the scope of the present disclosure.

Figure 2:
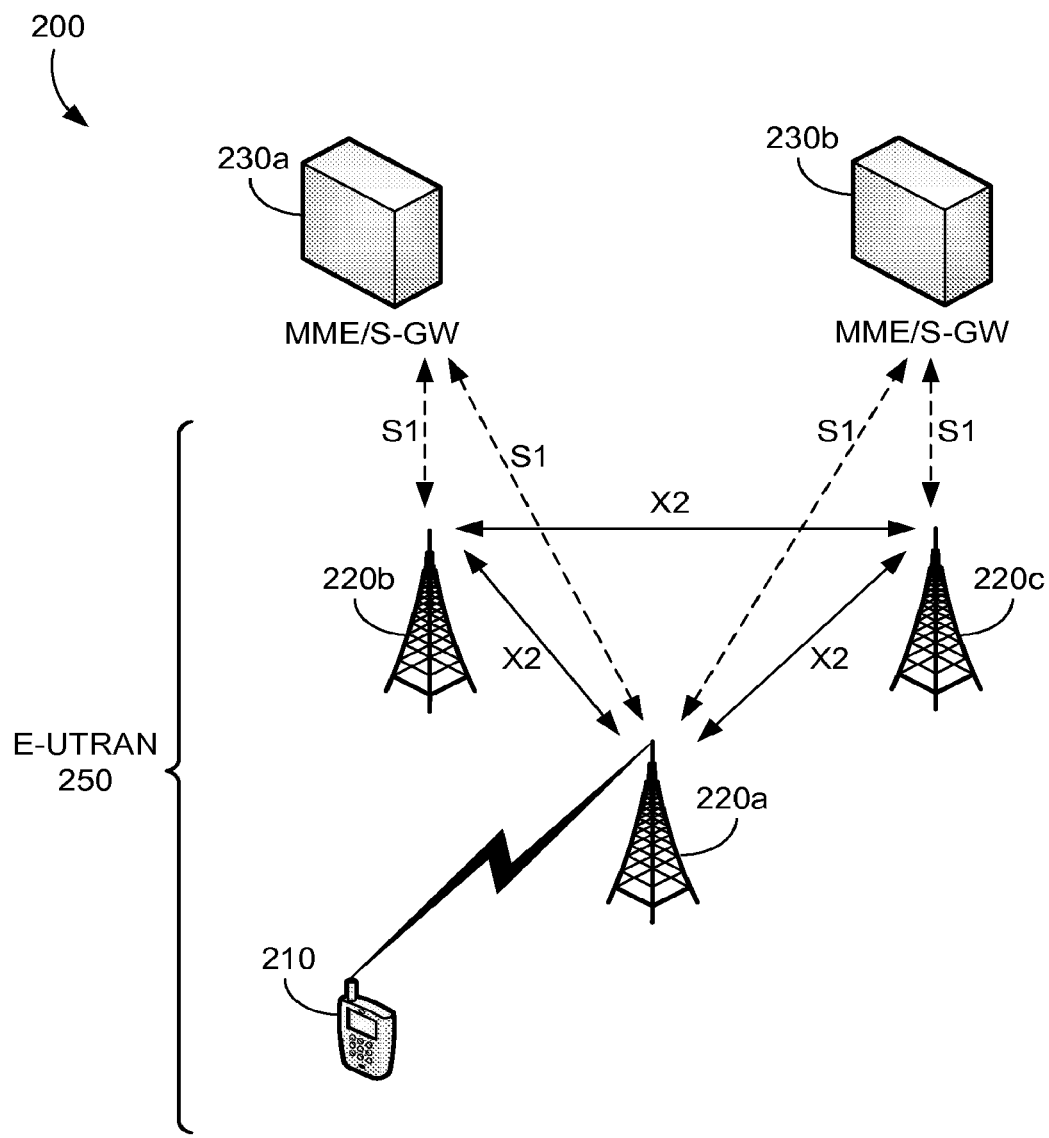
FIG. 2 illustrates a non-limiting exemplary network environment in which methods and systems for signaling uplink control information as disclosed herein may be implemented.

FIG. 2 shows wireless communication system/access network 200 which may be configured as part of or as an entire LTE or LTE-A system. Network 200 may include Evolved-Universal Terrestrial Radio Access Network (E-UTRAN) 250. E-UTRAN 250 may include UE 210, which may be any type of UE or WTRU, including UE 101 of FIG. 1, and one or more evolved Node Bs (eNodeBs) 220*a*, 220*b*, and 220*c*, which may be any device configured to perform the functions of an eNodeB, such as eNodeB 170 of FIG. 1. As shown in FIG. 2, the UE 210 may be in communication with eNodeB 220*a*. eNodeBs 220*a*, 220*b*, and 220*c* may interface with each other using an X2 interface. eNodeBs 220*a*, 220*b*, and 220*c* may also be connected to Mobility Management Entity (MME)/Serving Gateway(S-GW) 230*a* and/or 230*b*, through an Si interface. MME/S-GWs 230*a* and 230*b* may be any device configured to perform the functions of an MME/S-GW, such as MME/S-GW 180 of FIG. 1. Although a single UE 210 and three eNodeBs 220*a*, 220*b*, and 220*c* are shown in FIG. 2, it is contemplated that any number and combination of wireless and wired devices may be included in network 200.

In some embodiments implemented in an LTE-A system, it may be desirable to transmit UL control information (UCI) from a UE to an eNodeB in order to support UL user data transmissions and other UL transmissions, DL user data transmissions and other DL transmission, scheduling data, MIMO data, etc. UCI may include, but is not limited to, HARQ ACK/NACK(s), channel status reporting, CQI/PMI/RI, and/or scheduling request(s) (SR). It should be noted that the term of "user data" as used herein can be interchangeable with "SCH (shared channel) data". A UE may transmit UCI on PUCCH or PUSCH. Table 1 shows PUCCH formats defined for LTE that may be used in some embodiments and the corresponding UCI contents. Formats 2a and 2b are supported for normal cyclic prefix only. In some embodiments, when transmitting UCI on PUSCH, the same formats may be used.

TABLE 1

PUCCH Formats and Corresponding UCI contents

| PUCCH Format | Modulation Scheme | Number of bits per subframe, $M_{bit}$ | UCI |
| --- | --- | --- | --- |
| 1 | N/A | N/A | SR |
| 1a | BPSK | 1 | ACK/NACK (SR) |
| 1b | QPSK | 2 | ACK/NACK (SR) |
| 2 | QPSK | 20 | CQI/PMI/RI |

TABLE 1-continued

PUCCH Formats and Corresponding UCI contents

| PUCCH Format | Modulation Scheme | Number of bits per subframe, $M_{bit}$ | UCI |
| --- | --- | --- | --- |
| 2a | QPSK + BPSK | 21 | CQI/PMI/RI & ACK/NACK |
| 2b | QPSK + QPSK | 22 | CQI/PMI/RI & ACK/NACK |

The time and frequency resources that may be used by a UE to report UCI may be controlled by an eNodeB. Some UCI, such as CQI, PMI, and RI reporting may be periodic or aperiodic. In some embodiments, aperiodic reports may provide similar data to that provided by periodic reports, as well as additional data. In such embodiments, if both periodic and aperiodic reporting would occur in the same subframe, the UE may be configured to only transmit the aperiodic report in that subframe.

The CQI and PMI payload sizes of each PUCCH reporting mode may be predetermined, for example provided by 3GPP standard specifications. Other UCI type payload sizes of each PUCCH reporting mode may be predetermined, for example provided by 3GPP standard specifications.

In order to handle the increased UCI sizes and higher volumes of uplink control information (UCI) that may occur in LTE-A systems, several embodiments introduced by the present disclosure may be used. Some of the embodiments disclosed herein take advantage of the simultaneous PUSCH and PUCCH transmission capabilities of LTE-A.

In an embodiment, alternative configurations for signaling UCI from a UE in an LTE-A system may be employed in addition to the LTE UCI signaling methods. In a first such embodiment, multiple PUCCH transmissions may be used for multiple UCI fields or reports. Multiple PUCCH transmissions (or resources), for multiplexing multiple UCI fields/reports may be implemented such that multiple PUCCH transmissions are either code-multiplexed or frequency-multiplexed. For example, in LTE when the transmission of channel quality indicator (CQI) collides with the scheduling request (SR) transmission in the same subframe, the CQI is dropped. However, in LTE-A, it is possible to have CQI and SR transmitted simultaneously in the same subframe using code division multiplexing (CDM) (i.e., using different orthogonal phase rotations of a cell-specific sequence) or frequency division multiplexing (FDM) (i.e., using different resource blocks (RBs)). Accordingly, a UE may multiplex the PUCCH format 1 (possibly with 1a/1b) and format 2 (possibly with 2a/2b) to simultaneously transmit them over multiple PUCCH resources. Alternatively, multiple PUCCH transmissions may be considered to transmit high volume LTE-A UCI from a UE.

Figure 3:
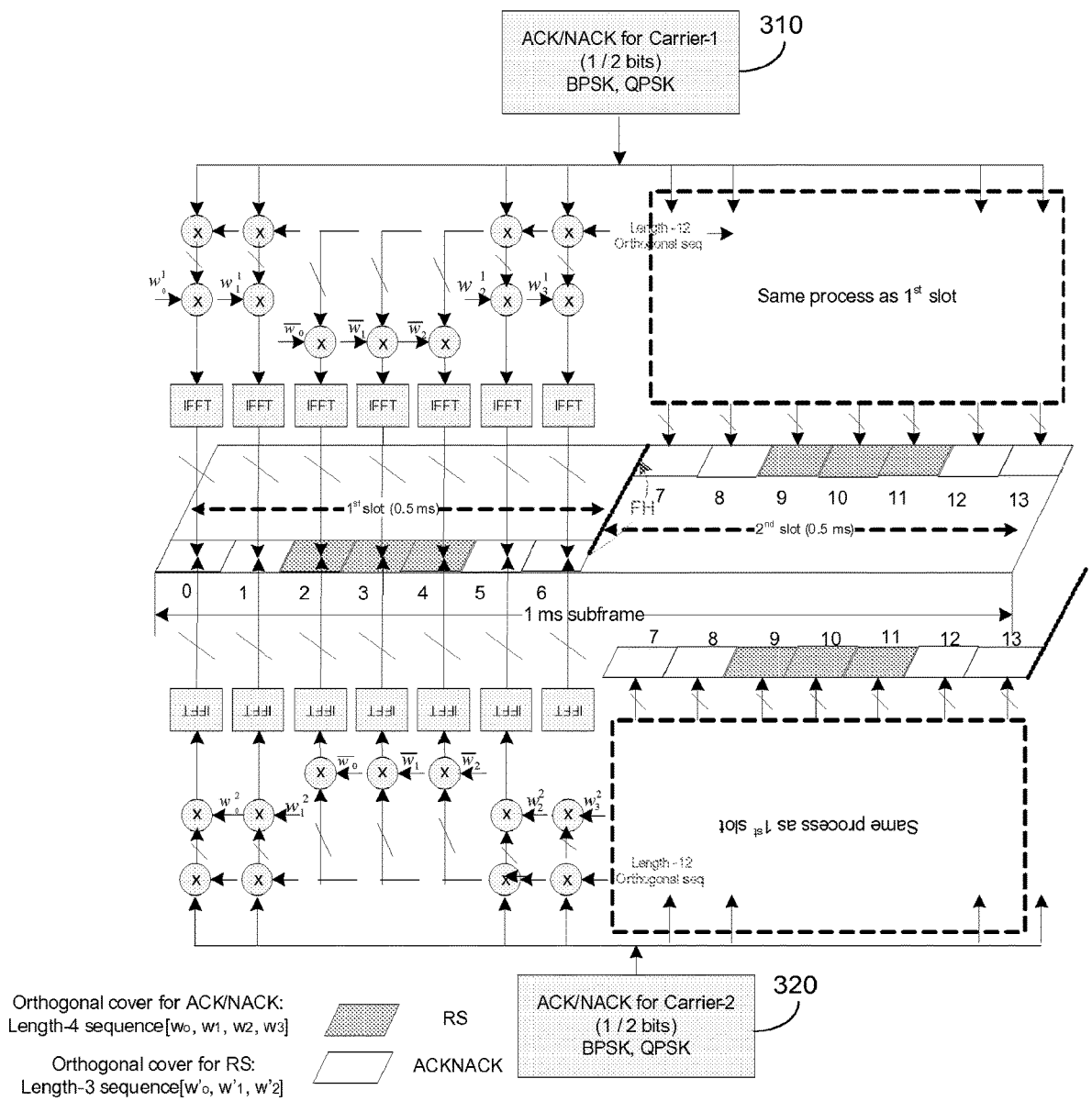
FIG. 3 illustrates a non-limiting exemplary system for transmitting ACK/NACK bits for different downlink carriers.

In embodiments implementing UCI signaling over multiple PUCCH resources, CDM, FDM, or time division multiplexing (TDM), or any combination thereof, may be used to signal UCI. In one embodiment, when high volume UCI is needed, the UCI may be transmitted from a UE over multiple PUCCH resources using CDM (i.e., different phase rotations of a cell-specific sequence). In such embodiments, different orthogonal phase rotations (equivalently cyclic shifts) of a cell-specific length-12 frequency domain (or time domain) sequence may be applied for each bit (or a group of bits, or different control fields) of UCI. For example, in the case of asymmetric bandwidth extension (such as 2 DL component carriers and 1 UL component carrier), HARQ ACK/NACK bits for different DL component carriers may be transmitted in a single UL carrier using different phase rotations of a cell-specific sequence. Alternatively or additionally, as illustrated in FIG. 3, ACK/NACK bits for different DL carriers (ACK/NACK bits 310 and 320) may be transmitted (on the same time-frequency resource) using the same phase rotated sequence, but using different orthogonal cover sequences, $w^1$ and $w^2$ for Carrier-1 and Carrier-2, respectively.

An eNodeB may configure a UE to multiplex multiple UCI fields/reports in a subframe by Layer 1 or 2 (L1/2) signaling or higher layer signaling. In embodiments that employ multiple PUCCH transmissions, if the total transmit power of the multiple PUCCHs exceeds the UE's maximum transmit power, denoted as Pmax, (or Pmax+P_threshold, where P_threshold is a threshold), then the UE may piggyback to the LTE UE procedure, (i.e., by dropping a low priority feedback report, such as CQI/PMI).

An eNodeB may employ blind detection for the multiple PUCCH transmissions to determine which PUCCH transmissions (UCI fields) are applied in the subframe. Alternatively, some of the power reduction/back-off approaches disclosed in U.S. patent application Ser. No. 12/703,092, filed Feb. 9, 2010, entitled "APPARATUS AND METHOD FOR UPLINK POWER CONTROL FOR A WIRELESS TRANSMITTER/RECEIVER UNIT UTILIZING MULTIPLE CARRIERS", which is hereby incorporated by reference in its entirety, may be used, in some embodiments with some modification. For example, after calculating the power levels for each PUCCH, if the sum of the powers exceeds Pmax, then the respective transmit power may be adjusted with an equal power or a relative power (depending on the priority of the individual channel) in order to comply with the maximum power limitation. Another option for the power setting for multiple PUCCHs is to modify the LTE PUCCH power control such as introducing a power offset for the individual PUCCH. Exceeding maximum allowed CC transmit power(s) may instead of or in addition to exceeding Pmax be considered for these decisions.

Figure 4:
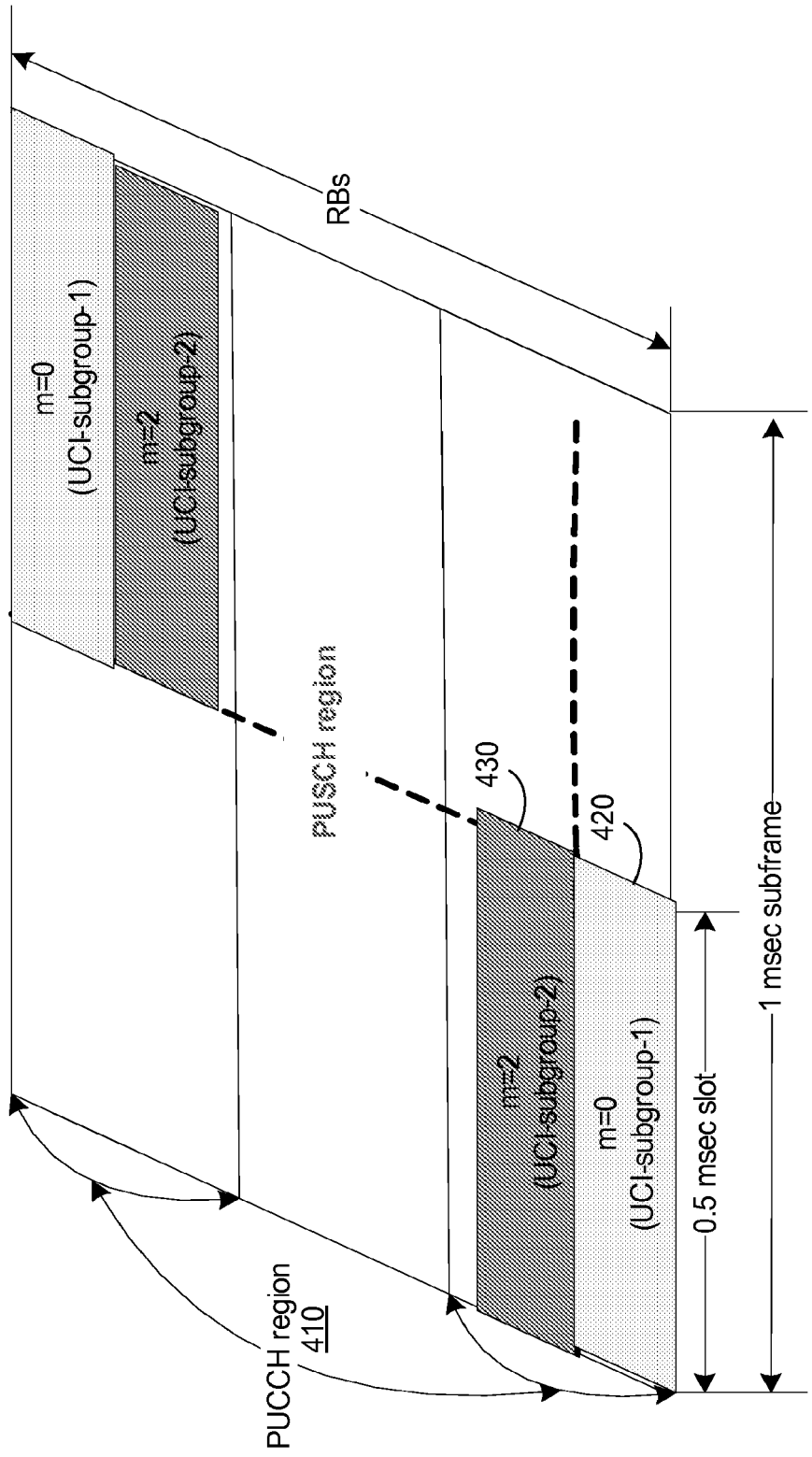
FIG. 4 illustrates non-limiting exemplary means for using multiple PUCCH RB resources in a PUCCH region for UCI transmission.

In an alternative embodiment, UCI signaling over multiple PUCCH resources may be implemented using FDM. In such an embodiment, each bit (or a group of bits like ACK/NACK bits and CQI bits, or different control fields) of UCI may be transmitted using a different RB pair within a pre-configured PUCCH region (i.e., PUCCH resources). FIG. 4 illustrates an example of using multiple PUCCH RB resources (FDM based) in PUCCH region 410 to transmit high volume UCI (e.g., multiple UCI reports) such that ACK/NACK is transmitted over RB 420 corresponding m=0, while in the same subframe CQI/PMI/RI is transmitted over a different RB, such as RB 430 corresponding m=2. Alternatively or additionally, in the case of asymmetric bandwidth extension (such as 2 DL component carriers and 1 UL component carrier), UCI bit(s) for different DL component carriers may be transmitted over different RB pairs such as m=0, 2 for Carrier-1 and Carrier-2, respectively.

In another embodiment, UCI signaling over multiple PUCCH resources may be implemented using TDM. In such an embodiment, each bit (or a group of bits like ACK/NACK bits and CQI bits, or different control fields) of UCI may be transmitted with time division base (TDB) on an OFDM symbol basis, on a slot basis, or on a subframe basis.

Note that in the above UCI signaling over multiple PUCCH resources embodiments, the UE may be configured by an eNodeB through higher layer signaling (or L1 signaling) regarding which PUCCH resources (time/frequency/code) are allocated to the UE. In these embodiments, the R8 LTE PUCCH formats may be maintained as specified in the 3GPP standard specification; that is, maintaining backward compatibility to R8 LTE. In addition, in the case of CDM (and FDM), the CM (cubic metric) may be increased depending on the number of resources (codes/phase rotations or RBs) in use. Accordingly, the impact of CM on the power setting for PUCCH may be taken into consideration, that is, to apply a power backoff by an amount of the CM increase, if any.

In another embodiment, UCI signaling over both PUCCH and PUSCH in the same subframe (transmitting UCI, for example high volume UCI, on both PUSCH and PUCCH(s) from a UE) may be implemented, for example when asymmetric carrier aggregation, higher order DL MIMO, and/or COMP is in use. For signaling UCI on both PUCCH(s) and PUSCH (simultaneous PUCCH and PUSCH transmission for UCI) in the same subframe, ACK/NACK and/or SR may be multiplexed with CQI/PMI/RI such that ACK/NACK and/or SR may be transmitted on PUCCH while in the same subframe (periodic or aperiodic) CQI/PMI/RI signaling may be carried out on PUSCH (or vice versa). In some embodiments, a UE with no user data to transmit may be configured to send UCI on PUSCH without UL data. For instance, a UE in DL COMP may transmit UCI (including ACK/NACK, CQI/PMI/RI, and SR) associated with the serving (anchor) cell over the PUSCH intended for the serving cell, while in the same subframe the UE may transmit other control information (e.g., CQI/PMI) targeting non-serving (anchor) cells over a pre-specified PUCCH(s) for that recipient cell(s), or vice-versa.

Figure 5:
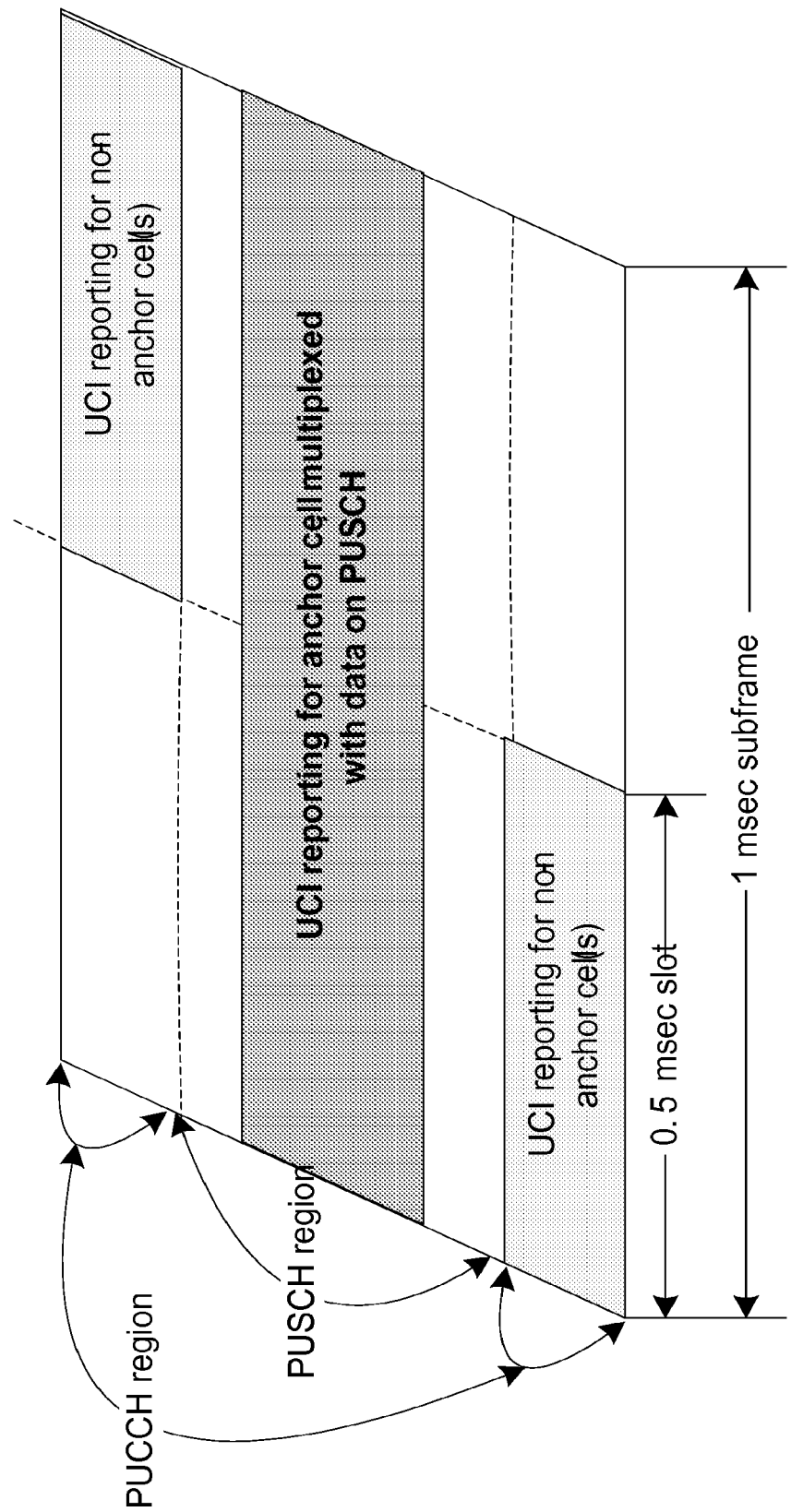
FIG. 5 illustrates non-limiting exemplary means for transmitting UCI on both PUCCH and PUSCH from a UE in a system utilizing downlink coordinated multi-point transmission (DL COMP).

FIG. 5 illustrates an example of transmitting UCI on both PUCCH(s) and PUSCH from a UE in DL COMP. In this example, it is assumed that the UE has UL shared channel (UL-SCH) data transmitted in the subframe. If the UE does not have any data to be transmitted at that time, UCI is sent on PUSCH without UL data. Alternatively or additionally, in the case of asymmetric CA (e.g., 1 UL carrier and N DL carriers where N>1), the UE may transmit UCI associated with the DL anchor carrier over either PUSCH or PUCCH(s). At the same time, the UE may transmit UCI for DL non-anchor carrier(s) over the other physical channel (e.g., unused for the DL anchor carrier). Alternatively, the UE may transmit UCI for DL non-anchor carrier(s) over PUSCH on a different UL component carrier (CC).

In an LTE-A system embodiment, the power setting for PUSCH and PUCCH, respectively, may be done independently. In the case of transmitting UCI over both PUSCH and PUCCH(s) in the same subframe, when Pmax is reached (i.e., the case of negative power headroom), power backoff approaches, including those described in U.S. patent application Ser. No. 12/703,092 referenced herein, such as equal power reduction, relative power reduction, or power reduction using channel (and/or UCI type) based priority, in order to comply with the maximum power limitation. Alternatively or additionally, a UE transmitting UCI using both PUSCH and PUCCH that detects that Pmax is reached may switch to the method of transmitting UCI using multiple PUCCH resources as disclosed herein. In another alternative, such a UE may transmit UCI using PUSCH only. Alternatively, the UE may transmit UCI using PUCCH only possibly dropping low priority UCI fields like CQI/PMI, if any. Exceeding maximum allowed CC transmit power(s) may instead of or in addition to exceeding Pmax be considered for these decisions.

In another embodiment, simultaneous periodic PUCCH and aperiodic PUSCH transmissions for UCI may be implemented. In legacy LTE (R8) systems, in the event of a collision between periodic CQI/PMI/RI reports and aperiodic CQI/PMI/RI, periodic CQI/PMI/RI reporting is dropped in that subframe. However, the UE may be configured to transmit both the aperiodic report and periodic report in the same subframe if necessary. For instance, in asymmetric CA, the UE may be configured to perform periodic CQI/PMI/RI, reporting associated with the DL anchor carrier using PUCCH and to perform aperiodic CQI/PMI/RI, reporting associated with DL non-anchor carrier(s) using the PUSCH, or vice versa, in the same subframe. When Pmax is reached (i.e., the case of negative power headroom), the UE may drop the aperiodic CQI/PMI/RI reporting on the PUSCH. Alternatively, the UE may drop the periodic CQI/PMI/RI reporting on the PUCCH. Exceeding maximum allowed CC transmit power(s) may instead of or in addition to exceeding Pmax be considered for these decisions.

In another embodiment, high volume UCI may be transmitted on PUSCH. When the UCI payload size is so large (such as the sum of the number of HARQ ACL/NACK bits and number of payload bits for CQI/PMI/RI is larger than a threshold) that it cannot fit into a PUCCH resource, the UCI may be sent on PUSCH with or without UL-SCH data (depending on whether the UE has been scheduled for data transmission or not), similar to LTE UCI signaling on PUSCH when UE has been scheduled for data transmission on PUSCH. In this embodiment, it may not be necessary for the UE to be scheduled for data transmission on PUSCH to carry the UCI. Rather, the UE may be configured by higher layer signaling or L1/2 signaling when the UCI is to be carried on PUSCH.

An eNodeB may configure a UE to transmit UCI on both PUCCH and PUSCH, or configure a UE to not transmit UCI on both PUCCH and PUSCH, for example depending on the UE's capability, DL/UL configuration/service, channel condition, PUSCH/PUCCH resource availability, and/or UE transmit power availability. The configuration may be given to the UE through L1/2 signaling or higher layer signaling. For transmitting UCI on both PUCCH(s) and PUSCH in the same subframe, after calculating the power levels for the PUCCH and PUSCH, respectively, if the sum of the powers exceeds Pmax, then power backoff approaches may be used (including those described in U.S. patent application Ser. No. 12/703,092 referenced herein), such as the respective channel transmit power may be adjusted/reduced with an equal power or a relative power (depending on the priority of the individual channel), or a predefined offset, in order to comply with the maximum power limitation. In yet another alternative, the UE may transmit the UCI on the PUCCH only possibly dropping low priority UCI fields like CQI/PMI. In still another embodiment, the UE may transmit all the required UCI fields on PUSCH only with or without uplink shared channel (UL-SCH) data depending on whether the UE has been scheduled for data transmission or not). In any of these embodiments, the eNodeB may employ blind detection for the individual physical channel (i.e., PUCCH and PUSCH) to determine which physical channel(s) (or UCI fields) are transmitted in the subframe. Exceeding maximum allowed CC transmit power(s) may instead of or in addition to exceeding Pmax be considered for these decisions.

In an alternative embodiment, legacy LTE UCI signaling may be performed by a UE with LTE-like DL/UL configuration (such as one-to-one DL/UL spectrum mapping, no COMP). The UCI overhead may be similar to LTE R8. However, unlike LTE R8, the UE may transmit HARQ ACK/NACK on PUCCH (in one embodiment, in order to improve ACK/NACK reliability), while in the same subframe transmitting aperiodic CQI/PMI/RI on PUSCH.

In another alternative, new PUCCH formats with higher order modulation (16QAM) may be used to support a larger UCI size. These new PUCCH formats may be defined using higher order modulation. As shown in Table 2, new PUCCH formats are introduced using 16QAM, (format 3, 4/4a/4b/4c). The PDCCH format 3 may be used for carrying 4 bits of ACK/NACK (possibly with SR). For example, 4 bits of ACK/NACK may be used in carrier aggregation (for example, 2 DL carriers with SM MIMO and 1 UL carrier). The PUCCH format 4/4a/4b/4c may be used to feedback 40 coded bits of CQI/PMI/RI bits (with ACK/NACK in 4a/4b/4c) in LTE-A. For the new formats disclosed herein, the power setting for PUCCH may include a power offset to accommodate the usage of higher order modulation, 16 QAM (i.e., to reflect the fact that different SINR is required for different modulation schemes).

TABLE 2

Extended PUCCH formats

| PUCCH Format | Modulation Scheme | Number of bits per subframe, $M_{bit}$ | UCI field(s) |
| --- | --- | --- | --- |
| 1 | N/A | N/A | SR |
| 1a | BPSK | 1 | ACK/NACK (SR) |
| 1b | QPSK | 2 | ACK/NACK (SR) |
| 2 | QPSK | 20 | CQI/PMI/RI |
| 2a | QPSK + BPSK | 21 | CQI/PMI/RI & ACK/NACK |
| 2b | QPSK + QPSK | 22 | CQI/PMI/RI & ACK/NACK |
| 3 | 16QAM | 4 | ACK/NACK (&SR) |
| 4 | 16QAM | 40 | CQI/PMI/RI |
| 4a | 16QAM + BPSK | 41 | CQI/PMI/RI & ACK/NACK |
| 4b | 16QAM + QPSK | 42 | CQI/PMI/RI & ACK/NACK |
| 4c | 16QAM + 16QAM | 44 | CQI/PMI/RI & ACK/NACK |

Note that in all of the embodiments set forth above using LTE-A UCI signaling, the eNodeB may configure the UE to transmit UCI by L1/2 signaling or higher layer signaling.

In an alternative embodiment, simultaneous PUCCH and SRS transmissions may be used in an LTE-A system that supports simultaneous PUCCH(s) (and PUSCH) and SRS transmissions in the SRS symbol location (last OFDM symbol). In such embodiments, a UE may transmit SRS even though SRS and PUCCH format 1/1a/1b (including normal PUCCH format 1/1a/1b) and/or 2/2a/2b (and potentially formats 3/4/4a/4b/4c as set forth herein) and the transmission occur in the same subframe simplifying such transmissions in an LTE-A system.

In another embodiment, UCI signaling may be performed in LTE-A systems that implement UL MIMO. Several MIMO modes for PUSCH may be used including spatial multiplexing (SM) MIMO (such as open loop and closed loop SM MIMO), beamforming (BF), and transmit diversity (such as cyclic delay diversity (CDD), space-time block coding (STBC), space-frequency block coding (SFBC), spatial-orthogonal resource transmit diversity (SORTD), etc). An LTE-A system configured according to the present disclosure may use any of the following MIMO modes for UCI signaling. For UCI transmission on PUCCH, any of the following MIMO options may be implemented:
 beamforming with one layer (In this case, the eNodeB provides a codebook or PMI feedback for the UE.);
 CDD transmission (tx) diversity;
 STBC/SFBC/SORTD;
 antenna switching (In this case, antenna switching may be done on an OFDM symbol basis or slot basis.); and
 when simultaneous PUSCH and PUCCH transmission in UL MIMO is implemented where UCI is transmitted on PUCCH, any one of the above MIMO options may be used for PUCCH regardless of the MIMO mode for PUSCH.

For UCI transmission on PUSCH, in one embodiment a UL MIMO scheme for the UCI part in PUSCH may be applied independently of the UL MIMO for the data part where the MIMO scheme for the UCI part may be any one of the following:
 beamforming with one layer;
 CDD tx diversity;
 STBC/SFBC;
 antenna switching (In this case, antenna switching may be done on a OFDM symbol basis or slot basis.);
 antenna selection; and
 the same MIMO mode as the data part of PUSCH may be applied for the UCI part.

In another embodiment, the UE may transmit all UCI bits on PUSCH only where a large UCI size may be used for LTE-A UCI transmission.

Methods and systems will now be described providing more detailed embodiments of simultaneous PUCCH/PUSCH UCI transmissions. Methods and systems are provided that allow a UE to determine which, if any, of the UCI bits to transmit on PUCCH and which, if any, to transmit on PUSCH. For a UE with user data to transmit on PUSCH, UCI transmitted on PUSCH may be transmitted along with the data. For PUSCH transmissions without user data, only the UCI may be transmitted on the PUSCH. In the below embodiments, the UCI bits may include the UCI for the given subframe for all of the active (or configured) downlink component carriers (DL CCs). Based on various factors such as scheduling, eNodeB requests, and DL transmissions, UCI bits for a given DL CC may include one or more of ACK/NACK bits (actual bits or bits reserved for ACK/NACK even if not sent), CQI bits, PMI bits, RI bits, other types of feedback bits (such as long-term (also called outerloop) PMI or short-term (also called innerloop) PMI), and any other control bits that a UE may send to the radio network. Different DL CCs may have different UCI bit types to be transmitted in a given subframe. Any one or more DL CCs may have no UCI bits to be transmitted in a given subframe. UCI bits may also include types of control bits not specifically related to DL CCs.

Note that CQI and PMI reports are typically reported together and are referred to as CQI/PMI reports herein. However, such reports may be reported separately, and the embodiments herein may be easily extended to such embodiments. As a variation to each of the methods and embodiments described herein, PUCCH may be extended to mean multiple PUCCHs if multiple PUCCHs are allocated in a given subframe and are allowed to carry UCI.

Figure 6:
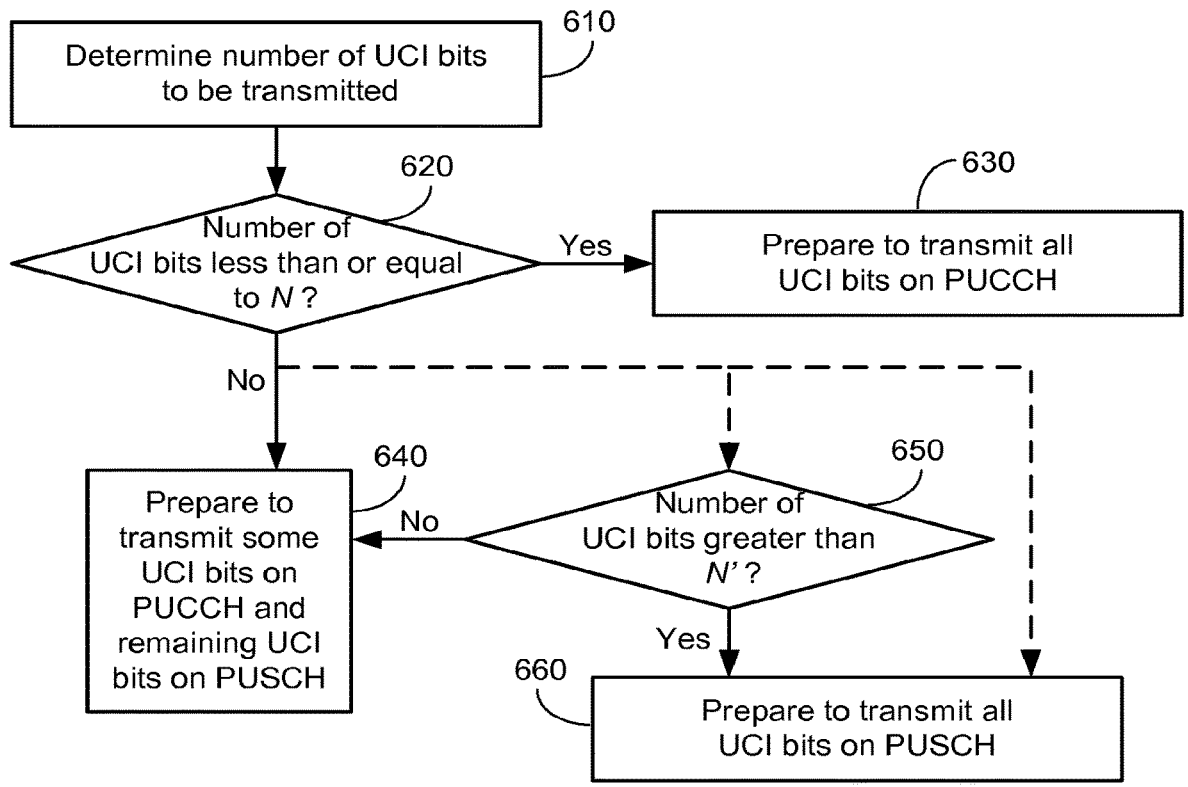
FIG. 6 illustrates a non-limiting exemplary method of determining how to signal UCI.

In an embodiment, a decision may be made as to how UCI is to be transmitted based on the number of UCI bits to transmit (which may also be referred to as the UCI payload size) within a subframe. FIG. 6 illustrates a method of implementing such an embodiment. At block 610, a determination is made as to the number of UCI bits to be transmitted. In one embodiment, this determination may exclude any aperiodic CQI/PMI/RI reporting bits and any other aperiodic reporting bits. Other embodiments may include such aperiodic reporting bits.

At block 620, a determination may be made as to whether the number of UCI bits is less than or equal to some number N. N may be pre-configured on a UE or signaled to a UE by an eNodeB. The value of N may be a function of PUCCH format such that there may be a different value of N for each PUCCH format. If the number of UCI bits is less than or equal to N, the UE may prepare to transmit all the UCI bits on the PUCCH at block 630. If the number of UCI bits is greater than N, the UE may prepare to transmit a subset of the UCI bits on PUCCH and the rest of the UCI bits on PUSCH at block 640. For example, the UE may prepare to transmit ACK/NACK bits on PUCCH and the remaining UCI bits (such as CQI, PMI, and RI bits) on PUSCH. Alternatively, a determination may be made at block 650 as to whether the number of UCI bits is greater than N', where N'>N. N' may be pre-configured on a UE or signaled to a UE by an eNodeB. The value of N' may be a function of PUCCH format such that there may be a different value of N' for each PUCCH format. In this embodiment, if the number of UCI bits is greater than N', then at block 660 the UE may prepare to transmit all the UCI bits on the PUSCH and none on the PUCCH. If the number of UCI bits is greater than N but less than or equal to N', the UE may prepare to transmit a subset of the UCI bits on PUCCH and the rest of the UCI bits on PUSCH at block 640. In another alternative, if the number of UCI bits is determined to be greater than N at block 620, then the UE may prepare to transmit all the UCI bits on the PUSCH and none on the PUCCH at block 660.

Note that barring other changes or determinations that may need to be made, such UCI bits may be transmitted without further adjustment. Throughout the present disclosure, a UE may be described as "preparing to transmit" UCI bits rather than merely transmitting such bits to allow for the possibility of additional adjustments before transmission of the UCI bits. For example, a UE may prepare to transmit UCI bits using both PUCCH and PUSCH, but may later determine that a power threshold would be reached by such a transmission (as described in more detail below) and therefore may actually transmit UCI bits using only one of PUCCH and PUSCH.

Figure 7:
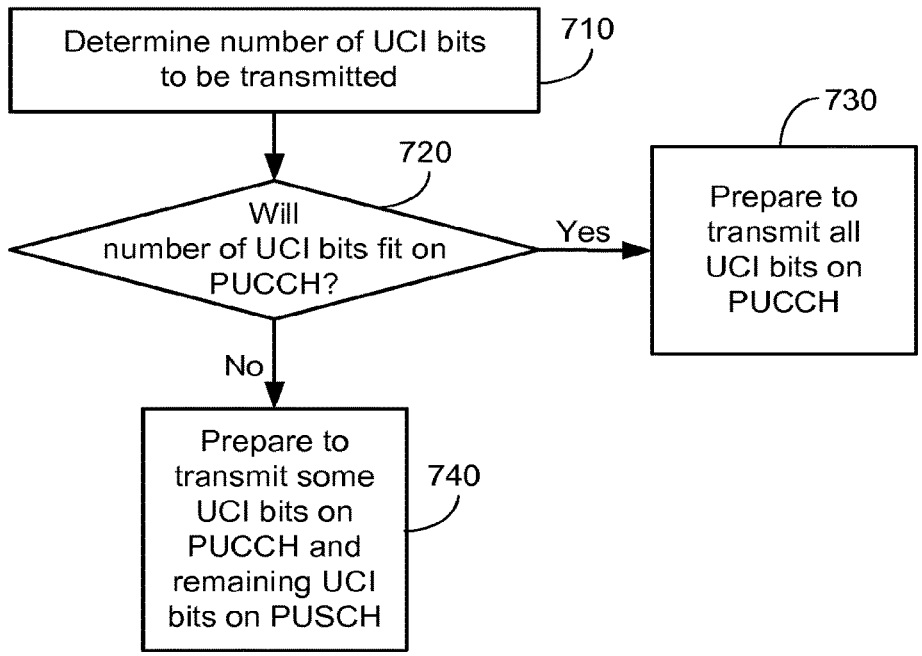
FIG. 7 illustrates another non-limiting exemplary method of determining how to signal UCI.

In an alternative embodiment, a UE may determine whether the UCI payload fits on the allocated PUCCH to determine how it will transmit UCI. FIG. 7 illustrates a method of implementing such an embodiment. At block 710, a determination is made as to the number of UCI bits to be transmitted (also referred to as the size of the UCI payload). In one embodiment, this determination may exclude any aperiodic CQI/PMI/RI reporting bits and any other aperiodic reporting bits. Other embodiments may include such aperiodic reporting bits.

At block 720, a determination is made as to whether all of the UCI bits will fit on the allocated PUCCH. If all of the UCI bits will fit on the allocated PUCCH, at block 730 the UE may prepare to transmit all the UCI bits on the PUCCH and none on the PUSCH. If the number of UCI bits does not fit on the PUCCH, at block 740 the UE may prepare to transmit a subset of the bits on PUCCH and the rest on PUSCH. For example, the UE may prepare to transmit ACK/NACK bits on PUCCH and the remaining UCI bits (such as CQI, PMI, and RI bits) on PUSCH. As another example, the UE may prepare to transmit the ACK/NACK bits for all the DL CCs and all the non-ACK/NACK bits (such as CQI, PMI, and RI bits) for as many DL CCs that will fit on the PUCCH and the non-ACK/NACK bits (such as CQI, PMI, and RI bits) for the other DL CCs on the PUSCH. When determining whether the UCI bits will fit on the allocated PUCCH, the UE may consider all the allowed PUCCH formats for that PUCCH.

Figure 8:
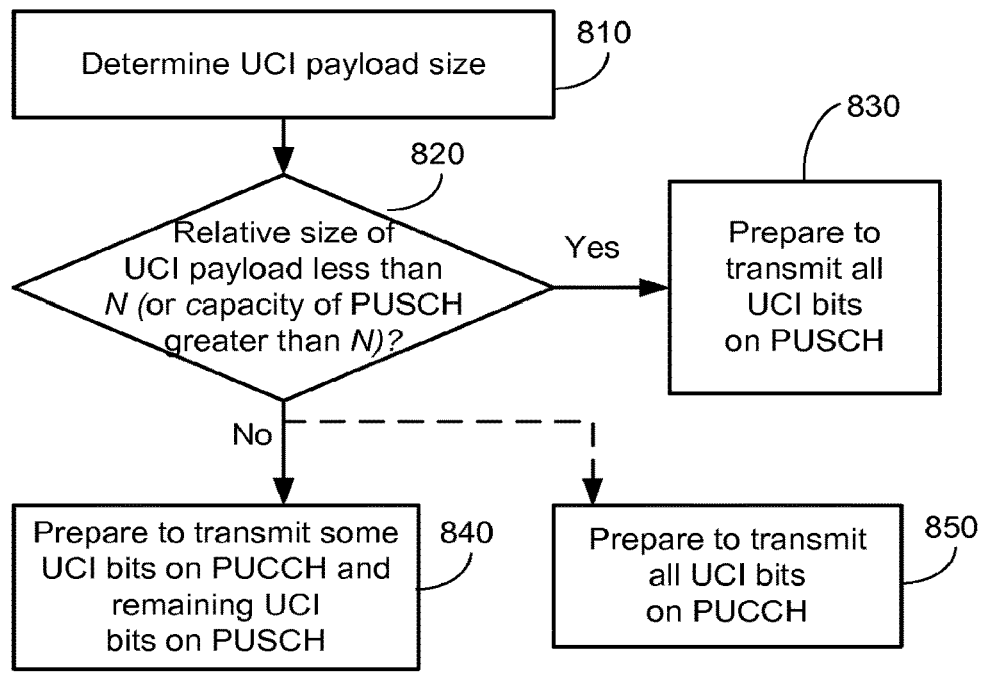
FIG. 8 illustrates another non-limiting exemplary method of determining how to signal UCI.

In another embodiment, the UE may compare the UCI payload size to one or more of the data payload size or the PUSCH size (which may also be called the PUSCH carrying capacity) to determine how it will transmit UCI. A PUSCH size may be measured using one or a number of factors such as the number of RBs, the number of OFDM symbols, the number of physical coded bits, or some combination of these or other factors. FIG. 8 illustrates a method of implementing such an embodiment. At block 810, a determination is made as to the payload size (number of bits) of the UCI to be transmitted. In one embodiment, this determination may exclude any aperiodic CQI/PMI/RI reporting bits and any other aperiodic reporting bits. Other embodiments may include such aperiodic reporting bits.

At block 820 the UE may determine a relationship between the UCI payload size and one or more of the data payload size and the PUSCH size. For example, the UE may compare to a threshold N the relative size (for example percentage) of the UCI payload to the PUSCH size or the relative size (for example percentage) of the UCI payload to the data payload to determine how to transmit UCI. N may be pre-configured on a UE or signaled to a UE by an eNodeB. For example, if the UCI payload size percentage of the PUSCH size, or the UCI payload size percentage of the data payload size, is smaller than the threshold N, the UE may prepare to transmit all UCI on PUSCH at block 830. If the UCI payload size percentage of the PUSCH size, or the UCI payload size percentage of the data payload size, is greater than or equal to the threshold N, the UE may prepare to transmit some UCI bits on PUCCH and other UCI bits on PUSCH at block 840, or the UE may prepare to transmit all UCI bits on PUCCH at block 850.

In an alternate embodiment, the UE may compare the PUSCH size to a threshold to determine how it will transmit UCI. A PUSCH size may be measured using one or a number of factors such as the number of RBs, the number of OFDM symbols, the number of physical coded bits, or some combination of these or other factors. Since this determination is independent of the UCI payload size, block 810 may be skipped. At block 820, the size of the PUSCH may be compared to a threshold value N. N may be pre-configured on a UE or signaled to a UE by an eNodeB. If the carrying capacity of the PUSCH is larger than a given threshold N, then the UE may prepare to transmit all UCI on PUSCH at block 830. In the case of a large PUSCH, the performance penalty for combining UCI with the data on PUSCH may be reduced so it may be desirable to transmit all of the UCI on PUSCH in this case and avoid the potential power limitations of simultaneous PUSCH-PUCCH due to maximum power reduction (MPR) effects. If the capacity of PUSCH is less than or equal to N, the UE may prepare to transmit some UCI bits on PUCCH and other UCI bits on PUSCH at block 840. Alternatively, the UE may prepare to transmit all UCI bits on PUCCH at block 850.

Figure 9:
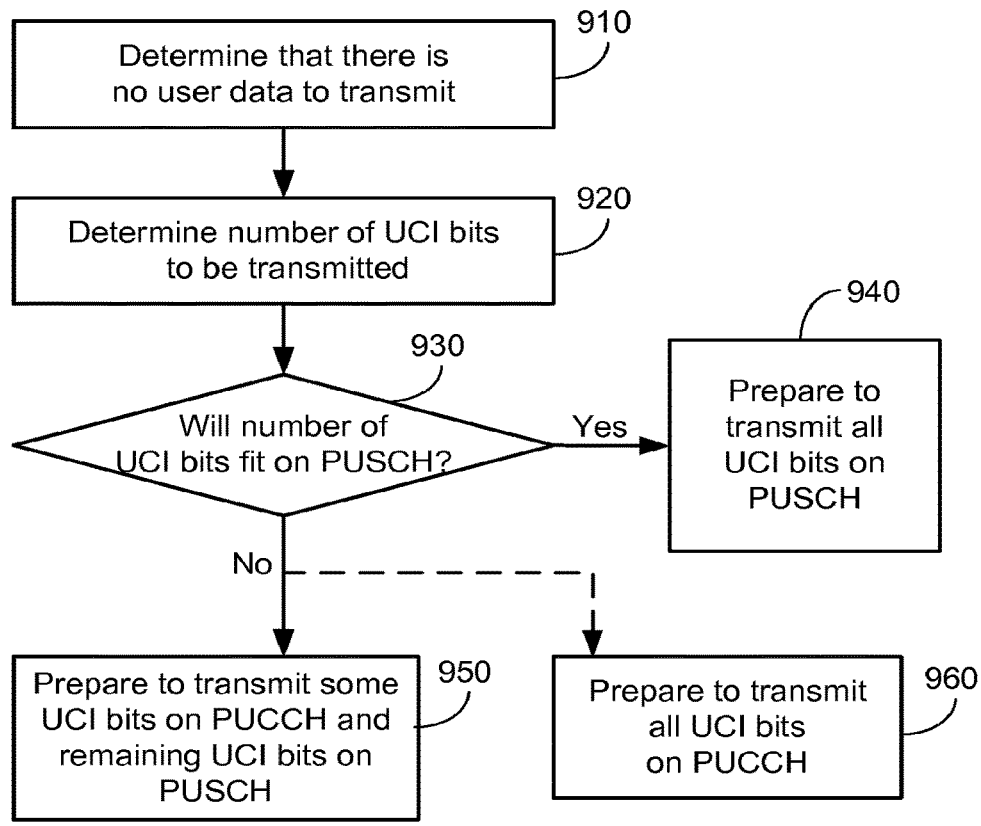
FIG. 9 illustrates another non-limiting exemplary method of determining how to signal UCI.

In other embodiments, if the UE is allocated a PUSCH and has no user data to send, the UE may prepare to transmit UCI on PUSCH or a combination of PUCCH and PUSCH depending on the UCI payload size. FIG. 9 illustrates a method of implementing such an embodiment. At block 910, a determination that no user data is available for transmission is made. At block 920, a determination is made as to the number of UCI bits be transmitted. At block 930 a determination is made as to whether all the UCI bits will fit on the PUSCH. If so, at block 940 the UE may prepare to transmit all the UCI on the PUSCH. If the number of UCI bits will not fit on PUSCH, at block 950 the UE may prepare to transmit a subset of the UCI on the PUCCH, such as the ACK/NACK bits, and the remainder of the UCI bits on the PUSCH. Alternatively, when the number of UCI bits does not fit on PUSCH, at block 950 the UE may prepare to transmit all UCI bits on PUCCH. Note that this may only be possible if the PUCCH carrying capacity is greater than that of the PUSCH. In these embodiments, PUSCH may be preferred over the PUCCH when the UCI bits will fit because when the UE has no data to send, transmitting the UCI on the PUSCH does not affect the performance on the PUSCH.

As a variation in any of these embodiments, if the UCI bits to be transmitted include CQI, PMI, or RI bits associated with aperiodic CQI/PMI or RI reports, the UE may exclude such bits when determining the number of UCI bits to be transmitted and/or when determining which bits may go on PUCCH. In such embodiments, the UE will always transmit CQI, PMI, and RI bits associated with aperiodic CQI/PMI and RI reports on the PUSCH. Such embodiments may be desirable when aperiodic reports are much larger than the periodic reports and are unlikely to fit on PUCCH. If additional aperiodic report types are defined for R10 or in the future, the UE may be configured to also exclude the bits for those reports in this manner and transmit those bits on the PUSCH always.

For example, if the number of UCI bits excluding any aperiodic CQI/PMI and RI report bits is less than or equal to some number N, or alternatively, less than or equal to the carrying capacity of PUCCH, then the UE may prepare to transmit all the UCI bits, except any aperiodic CQI/PMI and RI report bits, on the PUCCH, and may prepare to transmit aperiodic CQI/PMI and RI report bits on the PUSCH. If the number of UCI bits, excluding any aperiodic CQI/PMI and RI report bits, is greater than N, or alternatively greater than the carrying capacity of PUCCH, then the UE may prepare to transmit a subset of the bits on PUCCH and the rest on PUSCH. For example, in an embodiment the UE may prepare to transmit ACK/NACK bits on PUCCH and all CQI, PMI, and RI bits (for periodic and aperiodic reports) on PUSCH. Alternatively, if the number of UCI bits, excluding any aperiodic CQI/PMI and RI report bits, is greater than N' (where N'>N), then the UE may prepare to transmit all the UCI bits on the PUSCH and none on the PUCCH. In another alternative, if the number of UCI bits, excluding any aperiodic CQI/PMI and RI report bits, is greater than N, then the UE may prepare to transmit all of the UCI bits on the PUSCH and none on the PUCCH. N and N' may each be pre-configured on a UE or signaled to a UE by an eNodeB. The values of N and N' may each be a function of PUCCH format such that there may be a different value of N and/or N' for each PUCCH format.

Note that for any of the embodiments disclosed herein, when determining the carrying capacity of PUCCH, the UE may consider all the allowed PUCCH formats for the allocated PUCCH. In each of the embodiments, if scheduling is such that periodic and aperiodic UCI reports of the same type would be transmitted simultaneously for a given DL CC, the UE may omit the periodic report of that type for that CC from transmission and from the determination of the UCI payload size.

Figure 10:
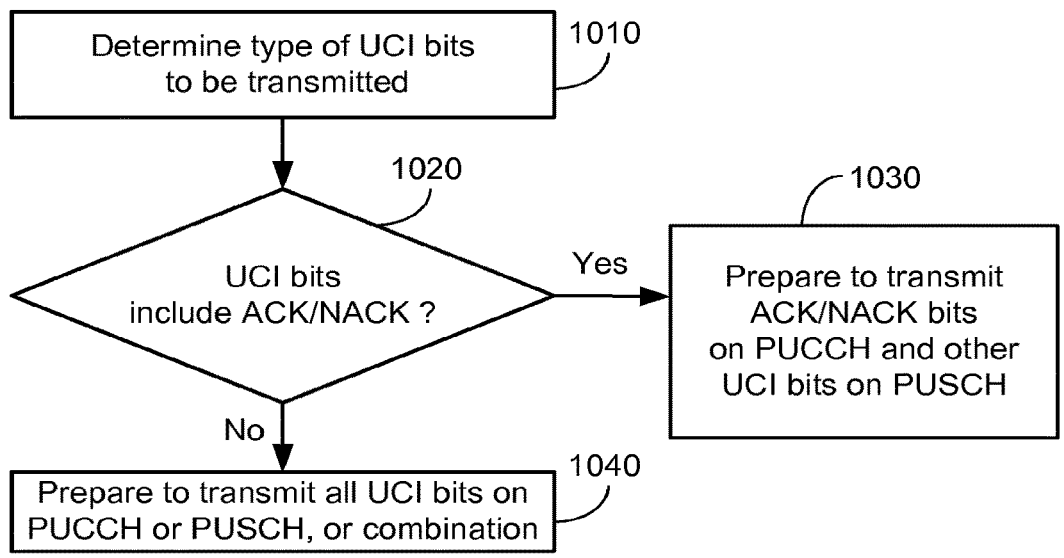
FIG. 10 illustrates another non-limiting exemplary method of determining how to signal UCI.

In other embodiments, a UE may determine how it will transmit UCI based on the type of UCI bits that it needs to transmit and such determination may be based on UCI type priority. In one such embodiment, illustrated in FIG. 10, the types of bits in UCI may be determined at block 1010. At block 1020, a determination may be made as to whether any of the UCI bits to be transmitted are ACK/NACK bits. If the UCI bits to be transmitted contain ACK/NACK bits, the UE may prepare to transmit the ACK/NACK bits on the PUCCH and all other types of UCI bits on the PUSCH at block 1030. Since the ACK/NACK bits may be the most important bits, they may be sent on the PUCCH for better performance than on the PUSCH.

Figure 11:
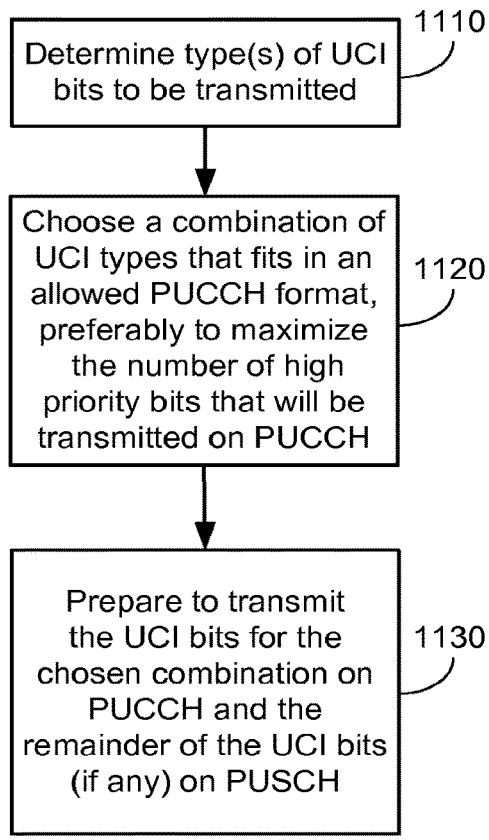
FIG. 11 illustrates another non-limiting exemplary method of determining how to signal UCI.

Alternatively, as illustrated in FIG. 11, a UE may be configured to know which types of UCI bits fit together on the PUCCH in each of the PUCCH formats and determine how to transmit UCI based on that knowledge. At block 1110, the types of bits in UCI to be transmitted may be determined by a UE. At block 1120 the UE may choose the combination of the highest priority types that fit together, in one embodiment such that the number of high priority bits that will be transmitted on PUCCH is maximized. At block 1130, the UE may prepare to transmit the combination of the highest priority types that fit together on the PUCCH using the appropriate PUCCH format. Note that in many embodiments, ACK/NACK has the highest priority, RI (or equivalent) has the second highest priority, and CQI/PMI (or equivalent) follows in priority. The UE may transmit all other types of UCI on the PUSCH.

Figure 12:
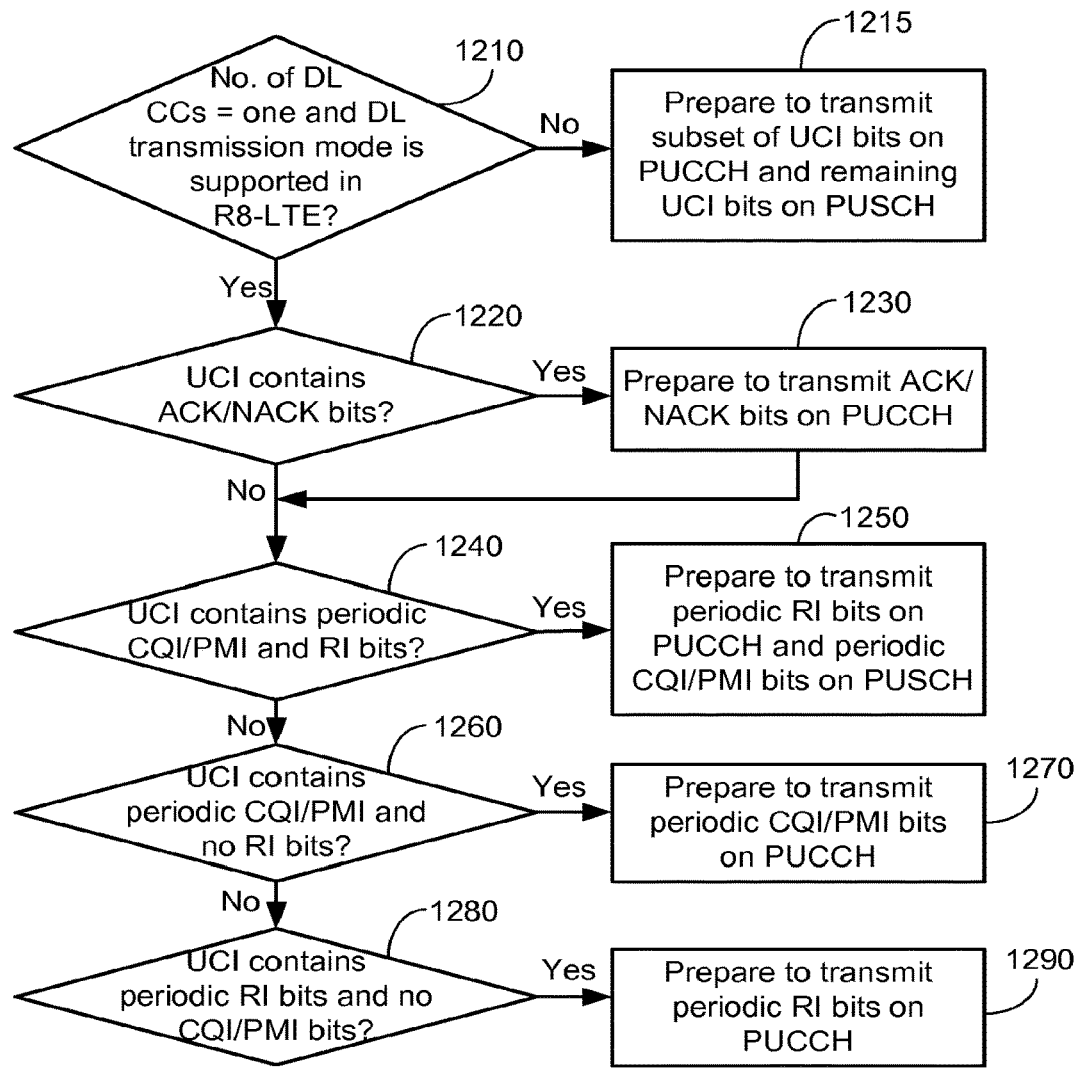
FIG. 12 illustrates another non-limiting exemplary method of determining how to signal UCI.

In further embodiments, a UE may determine how it will transmit UCI bits based on a downlink (DL) configuration, including, for example, a number of active (or configured) DL CCs and/or the DL transmission mode, such as the use of multi-antenna techniques. In one such embodiment, if a UE determines that the number of DL CCs is one and the DL transmission mode is a transmission mode supported in R8, the UE may prepare to transmit all of the UCI on PUSCH and none on PUCCH. An alternative embodiment using DL configuration is illustrated in FIG. 12. At block 1210, a determination may be made as to whether the number of DL CCs is one and the DL transmission mode is a transmission mode supported in R8-LTE. If not, for example if the number of DL CCs is greater than one, the UE may prepare to transmit a subset of the (aggregated) UCI bits on the PUCCH and the rest of the UCI bits on the PUSCH at block 1215. The UE may determine which bits to transmit on PUCCH and which bits to transmit on PUSCH in accordance with other methods and embodiments described herein.

If there is only one DL CC and the DL transmission mode is a transmission mode supported in R8-LTE, at block 1220, a determination may be made as to whether the UCI contains ACK/NACK bits. If so, at block 1230, the UE may prepare to transmit the ACK/NACK bits on the PUCCH. At block 1240, a determination may be made as to whether there are periodic CQI/PMI and periodic RI bits in the UCI. If so, the UE may prepare to transmit the periodic RI bits on PUCCH and the periodic CQI/PMI bits on PUSCH at block 1250. At block 1260, a determination may be made as to whether there are periodic CQI/PMI bits and no periodic RI bits. If so, the UE may prepare to transmit the periodic CQI/PMI bits on PUCCH at block 1270. At block 1280, a determination may be made as to whether there are periodic RI bits and no periodic CQI/PMI bits. If so, the UE may prepare to transmit the periodic RI bits on PUCCH at block 1290. If the UE determines that there are aperiodic UCI report bits, the UE prepares to transmit those on PUSCH.

In some embodiments, a UE may determine how it will transmit UCI based on UL transmission mode, such as the number of transmit antenna ports, and/or PUSCH configuration, including contiguous PUSCH RB allocation vs. non-contiguous PUSCH RB allocation. In one such embodiment, if a UE is configured to transmit PUSCH (carrying two codewords) with multiple antenna ports in a subframe, then the UE may prepare to transmit CQI/PMI bits on the PUSCH and the reminder of the UCI bits (e.g., ACK/NACK bits and/or RI bits) on PUCCH. Alternatively, the UE may prepare to transmit all of the UCI bits on PUSCH and none on PUCCH.

In other embodiments, if non-contiguous PUSCH RB allocation grant is given to a UE, then the UE may prepare to transmit all of the UCI on PUSCH and none on PUCCH. Otherwise (i.e., contiguous PUSCH RB allocation case), the UE may prepare to transmit UCI bits using one or more methods disclosed herein.

Figure 13:
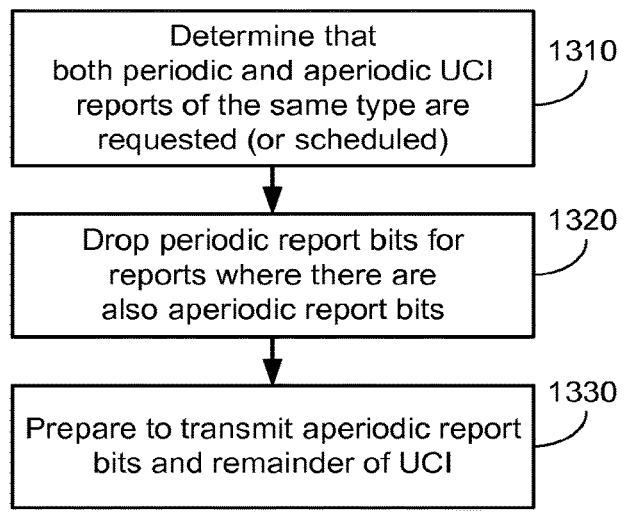
FIG. 13 illustrates another non-limiting exemplary method of determining how to signal UCI.

In some embodiments, there may be both periodic and aperiodic UCI reports of the same type requested (or scheduled for transmission) for a DL CC in the same subframe. In this case, the UE may transmit (or prepare to transmit) the aperiodic UCI report bits for that CC on PUSCH and the UE may drop (not transmit) the periodic report for that type for that CC. FIG. 13 illustrates one method of implementing such an embodiment. At block 1310, a determination may be made that there are both periodic and aperiodic reports of the same type requested (or scheduled for transmission) for a DL CC in the same subframe. At block 1320, the UE may drop (not transmit) the periodic report for that type for that CC. At block 1330, the remaining UCI contents may be transmitted or prepared for transmission, in some embodiments using one or more methods disclosed herein.

In some embodiments, there may be both periodic and aperiodic UCI reports requested for different DL CCs in the same subframe. For example there may be a periodic UCI report requested for one DL CC, while there may be an aperiodic UCI report requested for another DL CC. In this case, the UE may transmit (or prepare to transmit) the periodic UCI report bits on PUCCH and the aperiodic UCI report bits on PUSCH or vice versa.

Figure 14:
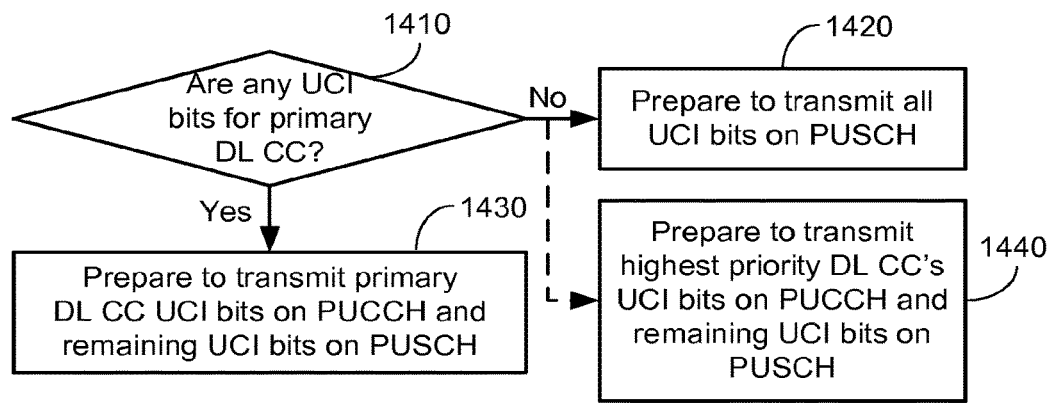
FIG. 14 illustrates another non-limiting exemplary method of determining how to signal UCI.

In other embodiments, a UE may use DL CC priority to determine how it will transmit UCI where the primary DL CC has the highest priority. FIG. 14 illustrates one method of implementing such an embodiment. At block 1410, a UE may determine whether any of the UCI bits are for a primary DL CC. If not, at block 1420, the UE may prepare to transmit all of the UCI on PUSCH. If there are bits of the UCI that are for a primary DL CC, then at block 1430, the bits associated with the primary DL CC may be prepared for transmission by the UE on the PUCCH, while the remaining bits of the UCI may be prepared for transmission on the PUSCH in the same subframe. For example, if the UCI consists of multiple periodic CQI/PMI reports to be transmitted in a given subframe, and one of the reports is for the primary DL CC, then, at block 1430, the UE may prepare to transmit the CQI/PMI report for the primary DL CC on the PUCCH and the other reports on the PUSCH. If none of the reports is for the primary DL CC, the UE may prepare to transmit all the reports on the PUSCH at block 1420.

Note that if it is determined at block 1410 that there are no bits to be transmitted for the primary DL CC, instead of transmitting all the UCI bits on PUSCH in block 1420, the UE may prepare to transmit the UCI bits for the next highest priority DL CC (as determined, for example, by the configuration order, DL CC index or ID, or any other means known to the UE and/or the eNodeB) on the PUCCH and the UCI for the other DL CCs on the PUSCH at block 1440. For example if the UCI consists of multiple periodic CQI/PMI reports to be transmitted in a given subframe, and none of the reports is for the primary DL CC, then the UE may prepare to transmit the CQI/PMI report for the next highest priority DL CC on the PUCCH and the other reports on the PUSCH. Options and alternatives for this next priority DL CC are as described herein for the primary DL CC.

Alternatively, if the UE is configured to be aware that only certain combinations of UCI types will fit on the PUCCH, when using the allowed PUCCH formats for the allocated PUCCH, then the UE may prepare to transmit the combination of the highest priority UCI types for the primary DL CC (for example ACK/NACK and periodic RI if periodic RI is to be transmitted; ACK/NACK and periodic CQI/PMI otherwise) on PUCCH and the other UCI types for the primary DL CC on the PUSCH at block 1430. Alternatively, the UE may drop the bits for the other UCI types for the primary DL CC. If there are no UCI bits for the primary DL CC, the same principles may be applied to the highest priority DL CC for which there is UCI at block 1440.

In another alternative, if the UCI to be transmitted in a given subframe includes ACK/NACK and a periodic CQI/PMI report for the primary DL CC, then the UE may prepare to transmit the ACK/NACK and periodic CQI/PMI report for the primary DL CC on the PUCCH and the other UCI bits on the PUSCH at block 1430. If there are no UCI bits for the primary DL CC, the same principles may be applied to the highest priority DL CC for which there is UCI at block 1440.

In some embodiments, a UE may determine how it will transmit UCI bits based on an explicit grant for UCI (e.g., for periodic CQI/PMI/RI reports.) In such embodiments, an eNodeB may explicitly provide a UL grant to a UE to transmit UCI without user data, for example via a new or modified DCI format or via higher layer signaling. For example, the eNodeB may provide an UL grant to the UE to transmit periodic reports such as for CQI/PMI or RI bits when it is aware that the UE does not have data to send and the scheduled UCI reports will not fit in PUCCH. In one embodiment, if the UE receives such a grant, the UE may prepare to transmit the UCI on the PUSCH only, in accordance with the grant. In another embodiment, the UE may split the UCI between PUCCH and PUSCH in accordance with one or more of the other embodiments described herein.

Figure 15:
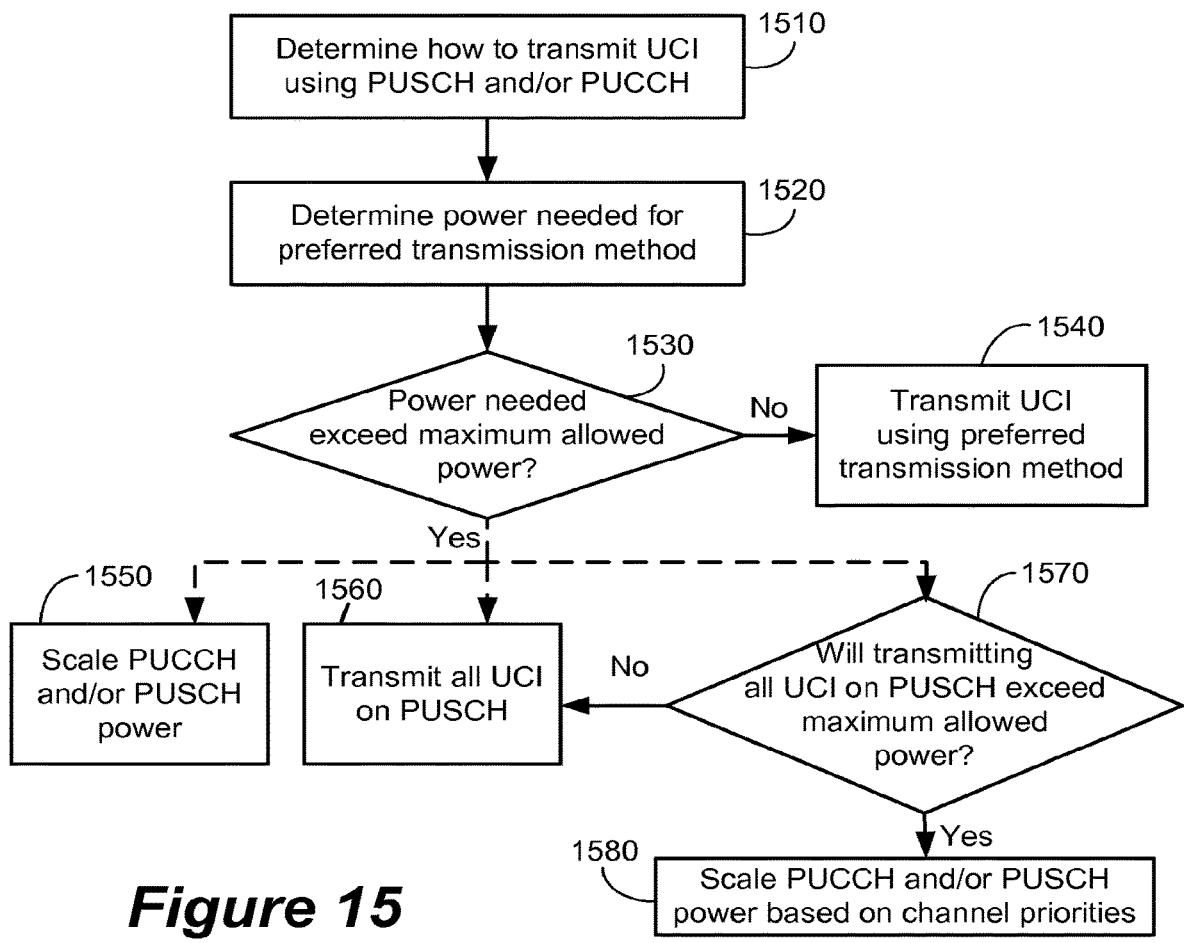
FIG. 15 illustrates another non-limiting exemplary method of determining how to signal UCI.

Note that in any of the methods and embodiments disclosed herein, a further determination of how UCI bits are to be transmitted may be made by a UE and/or an eNodeB based on whether or not a maximum power threshold has or will be met or exceeded. FIG. 15 illustrates a method of implementing one such embodiment. At block 1510, a UE may make a decision as to how to transmit UCI. Any means or method of transmitting UCI may be determined at block 1510, including splitting UCI between PUCCH and PUSCH in the same subframe, for example in accordance with any of the other embodiments disclosed herein. At block 1520, the UE may determine the power needed for transmission of the UCI using the means determined at block 1510. At block 1530, the UE may determine whether the power needed for transmission will exceed the maximum allowed power. If the maximum power will not be exceeded, at block 1540, the UCI bits will be transmitted according to the preferred method determined at block 1510. Decisions regarding whether maximum power will be exceeded may include one or more of the power limits configured or otherwise known to the UE such as CC maximum transmit power(s) and UE maximum transmit power.

If, at block 1530, it is determined that the maximum allowed power will be exceeded, the UE may take one or more alternate courses of action. In one embodiment, the UE may scale one or more of the PUCCH and PUSCH power at block 1550. Note that scaling methods and means that may be employed include, but are not limited to, those set forth in U.S. patent application Ser. No. 12/703,092 referenced herein.

Alternatively, if, at block 1530, it is determined that the maximum allowed power will be exceeded, the UE may transmit all the UCI on PUSCH at block 1560. Transmitting all the UCI on PUSCH eliminates MPR effects resulting from simultaneous PUSCH-PUCCH transmission which can reduce maximum allowed power.

In another alternative, if the UE determines that the maximum allowed power will be exceeded at block 1530, at block 1570 the UE may determine if transmitting all the UCI on PUSCH exceeds the maximum allowed power level. If transmitting all the UCI on PUSCH does not exceed the maximum allowed power level, transmitting all the UCI on PUSCH will eliminate the need to scale the power before transmission. If transmitting UCI on PUSCH will eliminate the need to scale the power, the UE may transmit all the UCI on PUSCH at block 1560. If transmitting all the UCI on PUSCH will not eliminate the need to scale the power, the UE may keep its original decision on UCI transmission method, for example splitting UCI across PUCCH and PUSCH in the same subframe, and scale the power on the PUCCH and the PUSCH at block 1580 in any manner as described for block 1550 such as based on the priorities of the channels. In such embodiments, the UCI on the PUCCH may be preserved since the PUCCH may have the highest priority.

Note that in any of the methods and embodiments disclosed herein, PUCCH and PUSCH may be transmitted over the same or different UL CCs. These methods and embodiments are applicable in both cases. An example for transmission on different UL CCs is PUCCH may be transmitted on the primary UL CC, while PUSCH may be transmitted on other UL CC.

In some LTE-A systems and implementations, multiple PUSCHs may be used per subframe. In such embodiments, a UE may have to determine on which PUSCH to transmit UCI bits when it has determined that any UCI bits are to be transmitted on PUSCH rather than, or in addition to, on PUCCH. Such bits are referred to herein as "UCI bits for PUSCH."

Figure 16:
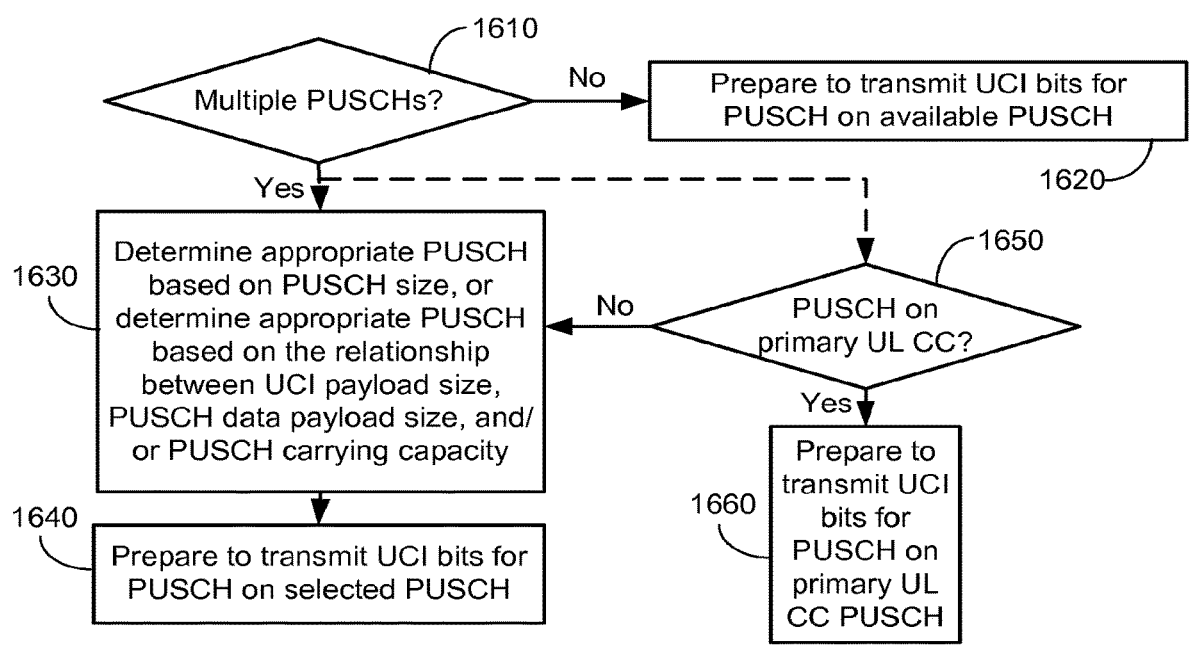
FIG. 16 illustrates another non-limiting exemplary method of determining how to signal UCI.

In one such embodiment, illustrated in FIG. 16, a UE may first determine whether multiple PUSCHs are in use or available at block 1610. If not, then at block 1620, the UE may prepare to transmit any UCI bits that are intended for transmission on PUSCH on the available PUSCH. If there are multiple PUSCHs available, a UE may choose a PUSCH for transmission of UCI based on PUSCH size (carrying capacity) at block 1630. In an embodiment, the UE may prepare to transmit the UCI bits for PUSCH on the PUSCH having a largest size (or carrying capacity). PUSCH size may be measured using one or a number of factors such as the number of RBs, the number of OFDM symbols, the number of physical coded bits, or some combination of these or other factors. Alternatively, at block 1630 the UE may choose the PUSCH based on the relationship between two or more of the UCI payload size, the PUSCH data payload size and the PUSCH carrying capacity. For example, the UE may transmit the UCI bits for PUSCH on the PUSCH for which the UCI payload size relative to (for example percentage of) the total payload size or the UCI payload size relative to (for example percentage of) the data payload is the smallest. Each of these embodiments may reduce the performance impact of including UCI with data on PUSCH. At block 1640, the UE may prepare to transmit the UCI bits for PUSCH on the PUSCH selected at block 1630.

In alternative embodiments, upon determining that there are multiple PUSCHs at block 1610, a UE may determine whether there is a primary UL CC that has a PUSCH at block 1650. If so, the UE may prepare to transmit the UCI bits for PUSCH on the primary UL CC's PUSCH at block 1660. The primary UL CC may be a UL CC that has been paired with the primary DL CC. If there is no PUSCH on a primary UL CC, a PUSCH may be selected using the means of block 1630 or any other means or method. In alternative embodiments, the UE may choose the PUSCH for transmission of UCI bits to be the PUSCH on the UL CC which is configured, or designated in some way, by the eNodeB for the UE to transmit ACK/NACK bits on.

In some embodiments, a UE may choose the PUSCH for transmission based on an explicit signaling or grant, such as a grant for an aperiodic UCI report request. In one such embodiment, the UE may prepare to transmit the UCI bits for PUSCH on the PUSCH explicitly designated by the eNodeB via L1 or higher layer signaling. In one alternative, if the eNodeB provides an UL grant specifically for UCI, the UE may prepare to transmit the UCI for PUSCH on the allocated PUSCH. In another alternative, if the UE receives a PDCCH having an aperiodic UCI request bit (or aperiodic request bit set to "1"), the UE may prepare to transmit the UCI bits for PUSCH on the PUSCH associated with this request by the PDCCH. Such UCI bits may include the aperiodic UCI report bits and all other UCI bits to be transmitted on the PUSCH.

Although features and elements of the embodiments and methods disclosed herein are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. A UE may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth™ module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for transmitting uplink control information, the method comprising:
   determining, by a wireless transmit/receive unit (WTRU), that the uplink control information is to be transmitted in at least a time interval, wherein the uplink control information comprises a first subset of uplink control information bits associated with a first priority and a second subset of uplink control information bits associated with a second priority, wherein the first priority is different than the second priority, wherein the first subset of uplink control information bits comprises at least a first type of uplink control information and the second subset of uplink control information bits comprises at least a second type of uplink control information, and wherein the first type of uplink control information comprises a hybrid automatic repeat request (HARQ) feedback;
   determining, by the WTRU, that the WTRU is to perform simultaneous transmissions of the first subset of uplink control information bits associated with the first priority via a physical uplink control channel (PUCCH) transmission and the second subset of uplink control information bits associated with the second priority via a physical uplink shared channel (PUSCH) transmission during at least the time interval; and
   simultaneously transmitting, by the WTRU, during at least the time interval, the first subset of uplink control information bits associated with the first priority via the PUCCH transmission and the second subset of uplink control information bits associated with the second priority via the PUSCH transmission.

2. The method of claim 1 comprising the WTRU receiving an indication that the WTRU is configured for simultaneous PUCCH and PUSCH transmissions.

3. The method of claim 1, wherein the first subset of uplink control information bits comprises a scheduling request (SR).

4. The method of claim 1, wherein the HARQ feedback comprises at least one of: a hybrid automatic repeat request (HARQ) positive acknowledgement (ACK) or a HARQ negative acknowledgment (NACK).

5. The method of claim 1, wherein the second subset of uplink control information bits comprises at least one of: a periodic channel quality indicator (CQI), an aperiodic CQI, a periodic precoding matrix index (PMI), an aperiodic PMI, a periodic rank indicator (RI), or an aperiodic RI.

6. The method of claim 1, wherein the first subset of uplink control information bits further comprises a scheduling request (SR) and wherein the second subset of uplink control information bits comprises at least one of: a periodic channel quality indicator (CQI), an aperiodic CQI, a periodic precoding matrix index (PMI), an aperiodic PMI, a periodic rank indicator (RI), or an aperiodic RI.

7. A wireless transmit/receive unit (WTRU) comprising:
   a processor configured to at least:
      determine that uplink control information is to be transmitted in at least a time interval, wherein the uplink control information comprises a first subset of uplink control information bits associated with a first priority, and a second subset of uplink control information bits associated with a second priority, wherein the first priority is different than the second priority, wherein the first subset of uplink control information bits comprises at least a first type of uplink control information and the second subset of uplink control information bits comprises at least a second type of uplink control information, and wherein the first type of uplink control information comprises a hybrid automatic repeat request (HARQ) feedback;
      determine that the WTRU is to perform simultaneous transmissions of the first subset of uplink control information bits associated with the first priority via a physical uplink control channel (PUCCH) transmission and the second subset of uplink control information bits associated with the second priority via a physical uplink shared channel (PUSCH) transmission during at least the time interval; and
      simultaneously transmit, during at least the time interval, the first subset of uplink control information bits associated with the first priority via the PUCCH transmission and the second subset of uplink control information bits associated with the second priority via the PUSCH transmission.

8. The WTRU of claim 7, wherein the processor is configured to receive an indication that the WTRU is configured for simultaneous PUCCH and the PUSCH transmissions.

9. The WTRU of claim 7, wherein the first subset of uplink control information bits comprises a scheduling request (SR).

10. The WTRU of claim 7, wherein the HARQ feedback comprises at least one of: a hybrid automatic repeat request (HARQ) positive acknowledgement (ACK) or a HARQ negative acknowledgment (NACK).

11. The WTRU of claim 7, wherein the second subset of uplink control information bits comprises at least one of: a periodic channel quality indicator (CQI), an aperiodic CQI, a periodic precoding matrix index (PMI), an aperiodic PMI, a periodic rank indicator (RI), or an aperiodic RI.

12. The WTRU of claim 7, wherein the first subset of uplink control information bits comprises a scheduling request (SR) and wherein the second subset of uplink control information bits comprises at least one of: a periodic channel quality indicator (CQI), an aperiodic CQI, a periodic precoding matrix index (PMI), an aperiodic PMI, a periodic rank indicator (RI), or an aperiodic RI.

13. A method for transmitting uplink control information, the method comprising:
   receiving, by a wireless transmit/receive unit (WTRU), an indication that the WTRU is configured for simultaneous physical uplink control channel (PUCCH) and physical uplink shared channel (PUSCH) transmissions;
   determining, by the WTRU, that the uplink control information is to be transmitted, wherein the uplink control information comprises a first subset of uplink control information bits associated with a first priority and a second subset of uplink control information bits associated with a second priority, wherein the first priority is different than the second priority, wherein the first subset of uplink control information bits comprises at least a first type of uplink control information and the second subset of uplink control information bits comprises at least a second type of uplink control information, and wherein the first type of uplink control information comprises a hybrid automatic repeat request (HARQ) feedback;
   determining, by the WTRU, that the WTRU is to perform simultaneous transmissions of the first subset of uplink control information bits associated with the first priority via a PUCCH transmission and the second subset of uplink control information bits associated with the second priority via a PUSCH transmission; and simultaneously transmitting, by the WTRU, the first subset of uplink control information bits associated with the first priority via the PUCCH transmission and the second subset of uplink control information bits associated with the second priority via the PUSCH transmission.

14. The method of claim 13, further comprising simultaneously transmitting, during a time interval, the first subset of uplink control information bits associated with the first priority via the PUCCH transmission and the second subset of uplink control information bits associated with the second priority via the PUSCH transmission.

15. The method of claim 13, wherein the PUCCH transmission is associated with a first cell and the PUSCH transmission is associated with a second cell, wherein the first cell is different than the second cell.

16. The method of claim 13, wherein the second subset of uplink control information bits comprises at least one of: a periodic channel quality indicator (CQI), an aperiodic CQI, a periodic precoding matrix index (PMI), an aperiodic PMI, a periodic rank indicator (RI), or an aperiodic RI.

17. A wireless transmit/receive unit (WTRU) comprising:
a processor configured to at least:
receive an indication that the WTRU is configured for simultaneous physical uplink control channel (PUCCH) and physical uplink shared channel (PUSCH) transmissions;
determine that uplink control information is to be transmitted, wherein the uplink control information comprises a first subset of uplink control information bits associated with a first priority, and a second subset of uplink control information bits associated with a second priority, wherein the first priority is different than the second priority, wherein the first subset of uplink control information bits comprises at least a first type of uplink control information and the second subset of uplink control information bits comprises at least a second type of uplink control information, and wherein the first type of uplink control information comprises a hybrid automatic repeat request (HARQ) feedback;
determine that the WTRU is to perform simultaneous transmissions of the first subset of uplink control information bits associated with the first priority via a PUCCH transmission and the second subset of uplink control information bits associated with the second priority via a PUSCH transmission; and
simultaneously transmit the first subset of uplink control information bits associated with the first priority via the PUCCH transmission and the second subset of uplink control information bits associated with the second priority via the PUSCH transmission.

18. The WTRU of claim 17, wherein the processor being configured to simultaneously transmit the first subset of uplink control information bits associated with the first priority via the PUCCH transmission and the second subset of uplink control information bits associated with the second priority via the PUSCH transmission comprises the processor being configured to simultaneously transmit the first subset of uplink control information bits associated with the first priority via the PUCCH transmission and the second subset of uplink control information bits associated with the second priority via the PUSCH transmission during a time interval.

19. The WTRU of claim 17, wherein the PUCCH transmission is associated with a first cell and the PUSCH transmission is associated with a second cell, wherein the first cell is different than the second cell.

20. The WTRU of claim 17, wherein the second subset of uplink control information bits comprises at least one of: a periodic channel quality indicator (CQI), an aperiodic CQI, a periodic precoding matrix index (PMI), an aperiodic PMI, a periodic rank indicator (RI), or an aperiodic RI.

* * * * *